(12) United States Patent
Cook et al.

(10) Patent No.: US 7,512,977 B2
(45) Date of Patent: *Mar. 31, 2009

(54) INTRUSTION PROTECTION SYSTEM UTILIZING LAYERS

(75) Inventors: Randall R. Cook, Springville, UT (US); Dwain A. Kinghorn, Highland, UT (US); Michael E. Sainsbury, Willoughby (AU)

(73) Assignee: Symantec Corporation, Cupertino, CA (US)

( * ) Notice: Subject to any disclaimer, the term of this patent is extended or adjusted under 35 U.S.C. 154(b) by 778 days.

This patent is subject to a terminal disclaimer.

(21) Appl. No.: 11/081,856

(22) Filed: Mar. 16, 2005

(65) Prior Publication Data

US 2005/0257265 A1 Nov. 17, 2005

Related U.S. Application Data

(63) Continuation-in-part of application No. 10/459,936, filed on Jun. 11, 2003, now Pat. No. 7,117,495.

(51) Int. Cl.
*G06F 11/30* (2006.01)
(52) U.S. Cl. .......................................... 726/22; 726/23
(58) Field of Classification Search ............. 726/22–26, 726/11–15; 713/150–154, 188; 709/224–225
See application file for complete search history.

(56) References Cited

U.S. PATENT DOCUMENTS

| | | | |
|---|---|---|---|
| 5,313,646 A | 5/1994 | Hendricks | |
| 5,537,539 A | 7/1996 | Narihiro | |
| 5,561,799 A | 10/1996 | Khalidi | |
| 5,586,304 A | 12/1996 | Stupek, Jr. et al. | |
| 5,905,990 A | 5/1999 | Inglett | |
| 5,930,513 A | 7/1999 | Taylor | |
| 5,933,647 A | 8/1999 | Aronberg et al. | |
| 5,991,402 A | 11/1999 | Jia | |
| 5,991,753 A | 11/1999 | Wilde | |
| 6,072,942 A * | 6/2000 | Stockwell et al. | ........... 709/206 |
| 6,161,218 A | 12/2000 | Taylor | |
| 6,185,574 B1 | 2/2001 | Howard et al. | |
| 6,356,915 B1 | 3/2002 | Chtchetkine | |
| 6,366,900 B1 | 4/2002 | Hu | |
| 6,374,402 B1 | 4/2002 | Schmeidler et al. | |
| 6,381,735 B1 | 4/2002 | Hunt | |
| 6,453,468 B1 | 9/2002 | D-Souza | |
| 2002/0029200 A1* | 3/2002 | Dulin et al. | ................... 705/67 |
| 2002/0157089 A1 | 10/2002 | Patel et al. | |
| 2002/0174215 A1 | 11/2002 | Schaefer | |
| 2003/0033441 A1 | 2/2003 | Forin et al. | |

OTHER PUBLICATIONS

Jeff Tranter, "CD-ROM and Linux", Linux Journal, Nov. 11, 1994. Retrieved from the Internet:<URL:http://www.linuxjournal.com/article/2851>.

(Continued)

*Primary Examiner*—Hosuk Song
(74) *Attorney, Agent, or Firm*—Advantedge Law Group

(57) ABSTRACT

The inventions relate generally to protection of computing systems by isolating intrusive attacks into layers, those layers containing at least file objects and being accessible to applications, those layers further maintaining potentially intrusive file objects separately from regular file system objects such that the regular objects are protected and undisturbed. Also disclosed herein are computing systems which use layers and/or isolation layers, and various systems and methods for using those systems. Detailed information on various example embodiments of the inventions are provided in the Detailed Description below, and the inventions are defined by the appended claims.

20 Claims, 11 Drawing Sheets

OTHER PUBLICATIONS

Jeff Tranter, "The Linux CD-ROM HOWTO", v.1.2, Aug. 21, 1994. Retreived from the Internet: <URL: http://www.ibiblio.org/pub/historic-linux/ftp-archives/sunsite.unc.edu/Nov-06-1994/docs/HOWTO/CDROM-HOWTO>.

ifs.5.1.tar.gz source code tarball, retrieved from the Internet:<URL:http://www.ibiblio.org/pub/historic-linux/ftp-archives/tsx-11.mit.edu/Oct-07-1996/ALPHA/ifs/>.

Newcomb, "Softricity has cure for app conflict blues", Thin Planet website, May 2002, parts 1 and 2, Jupitermedia Corp.

"SystemGuard", www.softricity.com website, Apr. 24, 2003 or earlier.

"SoftGrid for Windows Desktops Transforms Business Applications into Web-enabled services, reshaping the economics of enterprise . . . ", www.softricity.com website, Oct. 15, 2001.

"Softricity secures $14.6 million in oversubscribed third round venture funding", www.softricity.com website, Jul. 29, 2002.

"Microsoft and Softricity announce agreement to manage existing Windows applications with web services", www.softricity.com website, May 28, 2002.

"Softricity announces SoftGrid 2.0 first customer deployments and general availability", www.softricity.com website, May 6, 2002.

"Softricity unveils SoftGrid Dual-Mode", www.softricity.com website, Mar. 24, 2003.

"Softricity becomes premier member of Citrix Business Alliance", www.softricity.com website, Feb. 25, 2002.

"SoftGrid Sequencer", www.softricity.com website, Apr. 24, 2003 or earlier.

Longwell, "Softricity lowers price on Dual-Mode deployments", www.crn.com website, Mar. 28, 2003.

"Microsoft and Softricity announce agreement to manage existing Windows-based applications with Web services", a Microsoft website, May 28, 2002.

"Softricity Data Sheet: Softricity SystemGuard; The foundation for stable on-demand application access", www.softricity.com website, Feb. 2002.

"Softricity Data Sheet: Softricity SystemGuard; Softricity's patent-pending technology enables any application to run on any desktop . . . ", www.softricity.com website, Oct. 2002.

"Turning software into a service: there are no silver bullets", www.softricity.com website, Apr. 24, 2003 or earlier.

"Softricity acquires intellectual property of Seaport Software to extend virtual installation technology", www.choicesolutions.com website, Nov. 18, 2002.

"Softricity SoftGrid Platform: Softricity platform training guide", www.softricity.com website, Apr. 24, 2003 or earlier.

"Clean Slate", http://www.fortres.com/products/cleanslate.htm, Jan. 13, 2004.

"FAQ—2001013", http://www.fortres.com/support/faqviewarticle.asp?ID=2001013, Oct. 24, 2003.

"FAQ—2001014", http://www.fortres.com/support/faqviewarticle.asp?ID=2001014, Nov. 25, 2003.

"FAQ—2001015", http://www.fortres.com/support/faqviewarticle.asp?ID=2001015, Nov. 23, 2003.

"FAQ—2001025", http://www.fortres.com/support/faqviewarticle.asp?ID=2001025, Dec. 15, 2003.

"Clean Slate FAQ", http://www.fortres.com/products/cleanslate_faq.htm, Jan. 13, 2004.

"Awards", http://www.fortres.com/products/awards.htm#cleanslate, Jan. 13, 2004.

Microsoft Windows NT Resource Kit, 1993, Microsoft Press, vol. 1, pp. 325-346.

Heidemann, J.S., File-System Development with Stackable Layers, Feb. 1994, ACM Transactions on Computer Systems, vol. 12, No. 1, pp. 58-89.

* cited by examiner

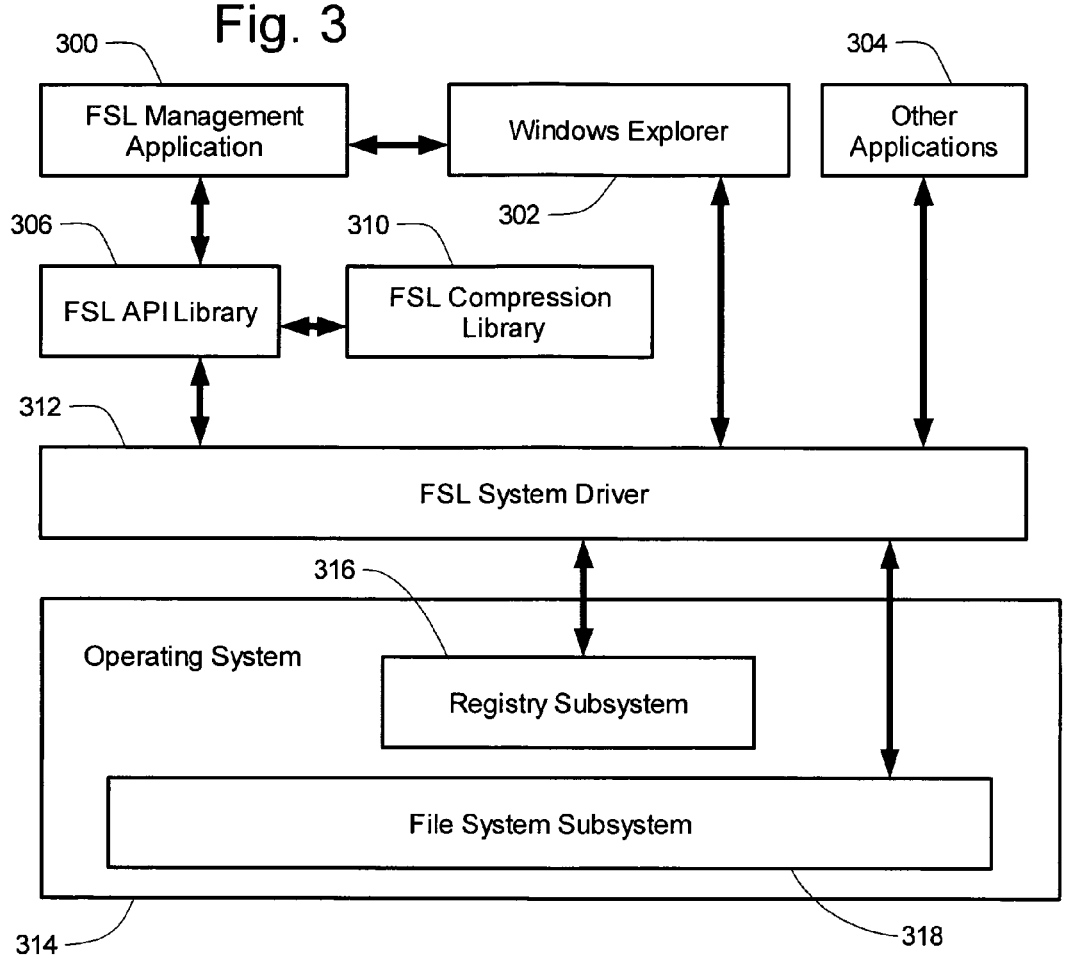
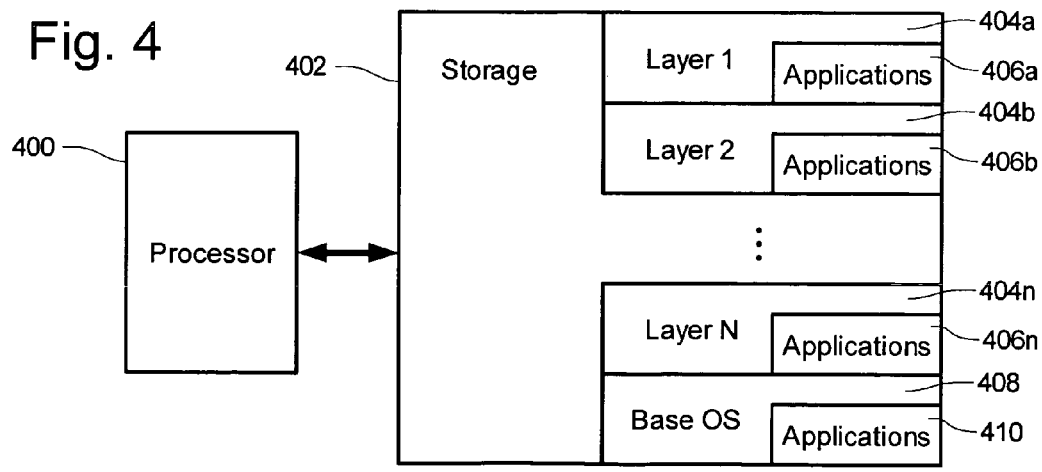

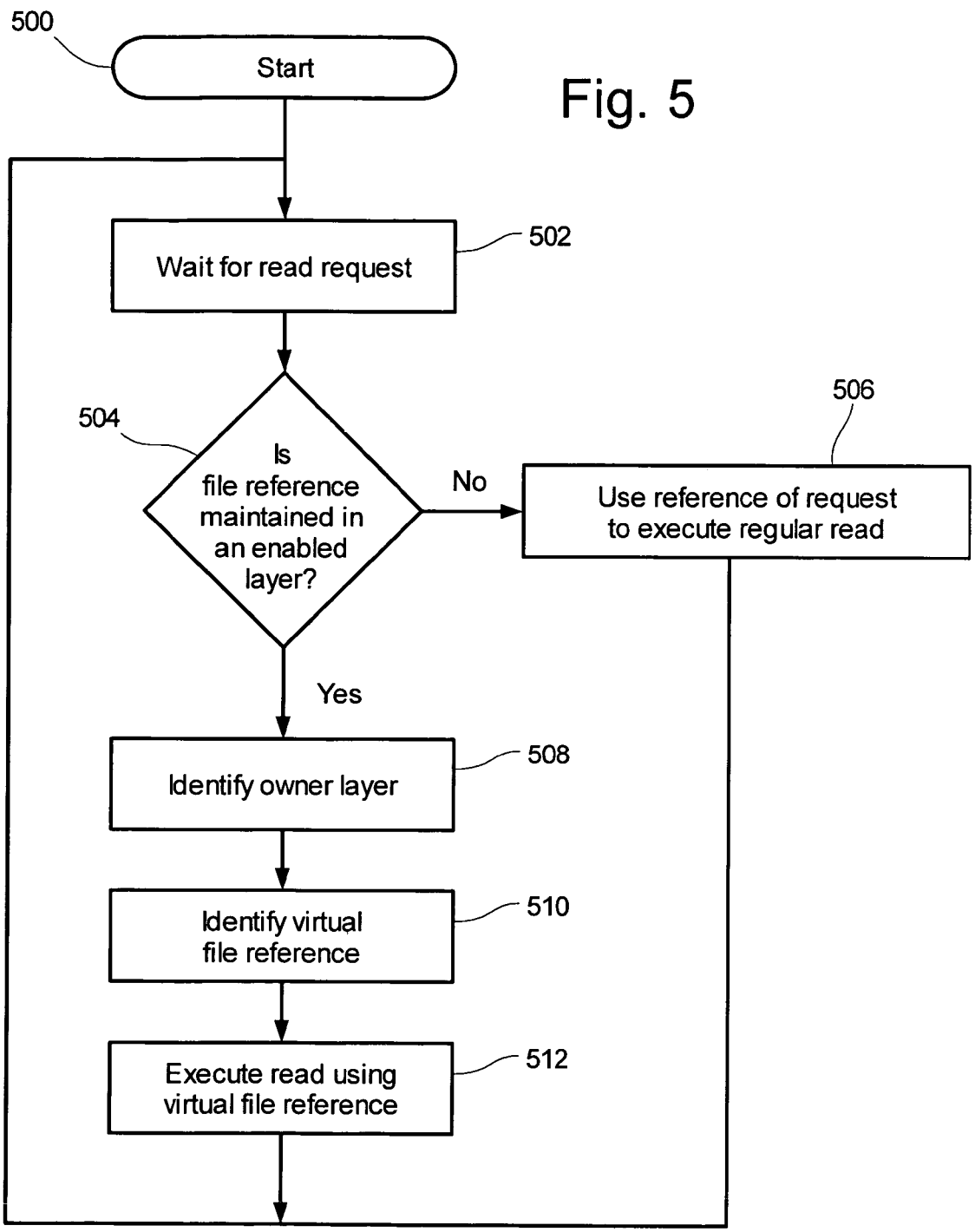

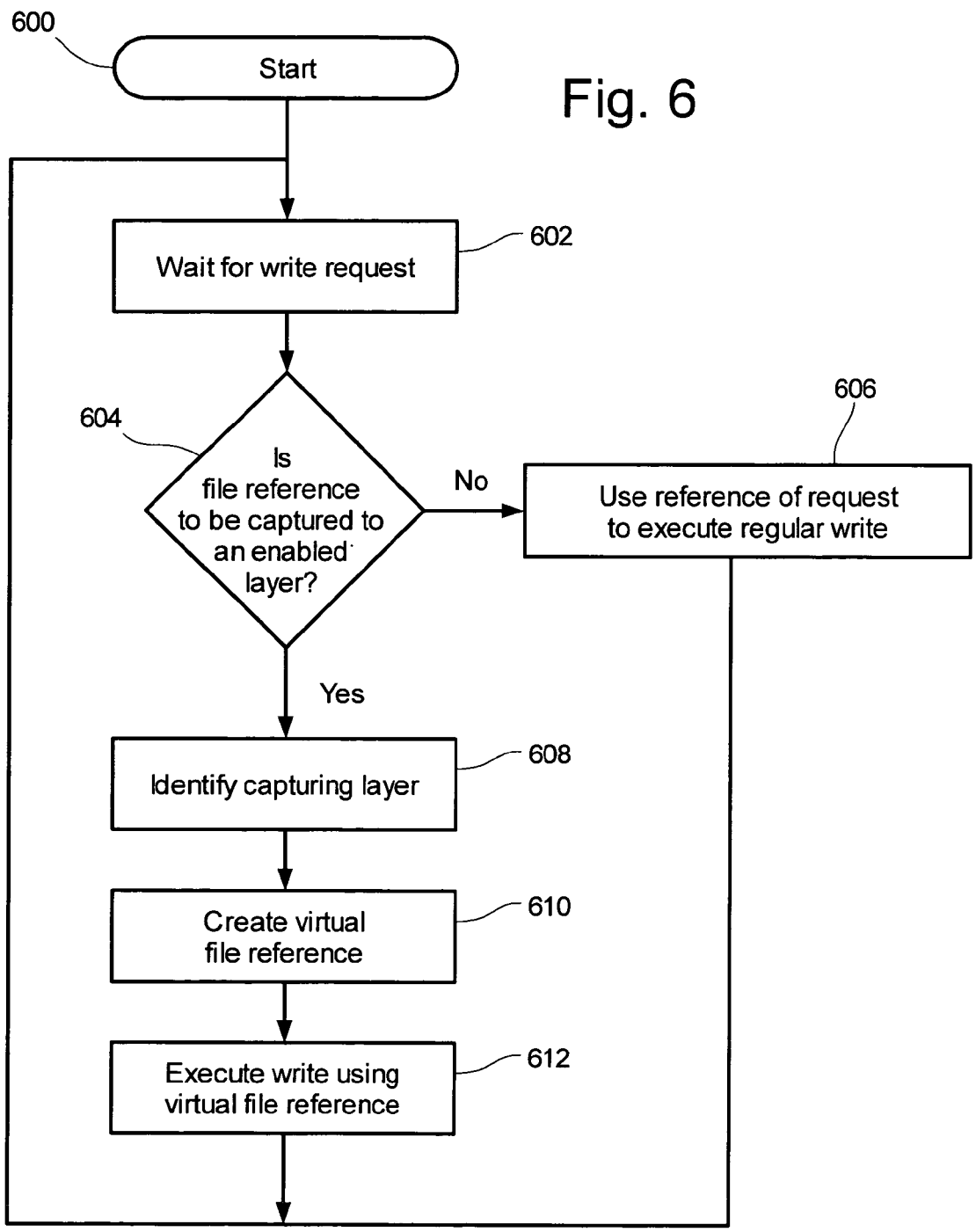

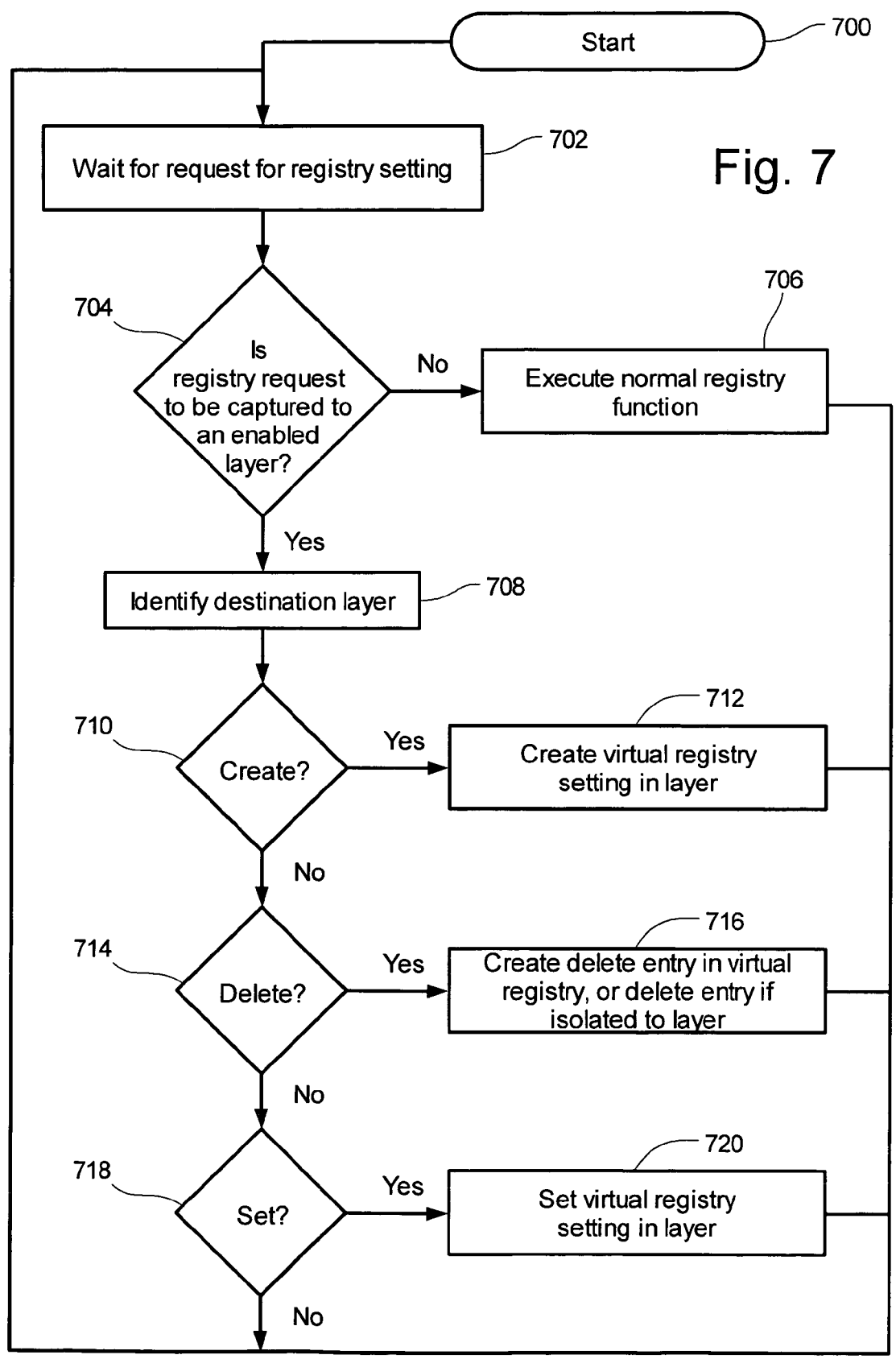

INTRUSTION PROTECTION SYSTEM UTILIZING LAYERS

CROSS-REFERENCE TO RELATED APPLICATIONS

This application is a continuation-in-part of U.S. application Ser. No. 10/459,936 filed Jun. 11, 2003, now U.S.Pat. No. 7,117,495 which is hereby incorporated by reference in its entirety. This application additionally contains subject matter related to U.S. application Ser. Nos. 10/459,768, 10/459,870, 11/026520 and 11/027489, each of which is also hereby incorporated by reference in its entirety.

BACKGROUND OF THE INVENTIONS

All intrusions to computing systems are commenced with the purpose of accessing either the information, processing or communication facilities of those systems. For example, a person may wish to gain shell access to a system to run programs thereon. A person might also wish to gain access to personal or financial information stored on the hard drive of a computer, by which that person might form a profile of that person or steal his identity. Recently, intrusive attacks frequently send surreptitious email messages to others, or convert the computing system into a "zombie", a system that can be remotely controlled to send messages, intrusive attacks or large quantities of communications to cripple other computing systems.

Of the most frequently used intrusive methods, viruses are perhaps the most common. Originally, a virus was understood to be a code fragment that could "infect" other executable code and thereby propogate itself to programs or other executable objects. Early viruses propagated from infected programs at the time those programs were started, by copying the virus code fragment to other accessible executable objects. Viruses could also be crafted to infect the master boot record of disks, and other program objects. More recently, programs that propogate by email attachment have been referred to as viruses. Those viruses use methods that are more sophisticated than the early viruses, and may infect a computer (rather than just an executable program) by copying one or more applications thereto and configuring the computer to automatically execute the virus software. Modern email viruses may scan a hard disk for email addresses to which new emails may be sent containing a virus.

Of the many virus types, one characteristic is generally shared. Viruses require some user intervention in order to propogate. This user intervention might be executing an infected executable, booting from an infected disk, or executing an email attachment. Worms, a second category of intrusive programs, do not require user intervention. Worms take advangate of weaknesses in the security of a computing system, which weaknesses are called "exploits." Exploits might be as simple as passwords that are missing or too simple to provide adequate security. Other attacks utilize buffer overflow weaknesses or other bugs to capture execution of a program by carefully crafted messages transmitted over a network. The most effective countermeasure to worms has proven to be the firewall; although if an exploit can be found for an application operating on a commonly used port even a firewalled system may be vulnerable.

A worm or virus may modify the storage of a computer to provide repeated execution even if the computing system is rebooted. Referring now to FIG. 9A, the organization of a typical executable produced from a compiler is conceptually shown. The executable 900 contains a block of program data 904, followed by program code 908 initiated by directing a processor to begin execution at location 906 "ProgStart". Now different executables will have blocks of data in various sizes, and therefore the offset of "ProgStart" 908 from the beginning of the executable file 900 varies. At the time the executable 900 is produced, the compiler generates a jump instruction 902 to the program start location 906, thereby permitting the operating system to run the executable program.

A virus may modify an executable file as shown in FIG. 9A to a form shown in FIG. 9B, thereby causing infection. The virus first modifies executable file 900 by appending virus code 912 to the end of the file, resulting in the three blocks of data and code shown in infected program 900v. The virus modifies the vector of jump instruction 902 to point to the start 910 of the virus code 912, and saves the old program vector in a new jump instruction 914. The infected program, when executed, first starts at "VirusStart" 910, which executes the virus code 912. When the virus code completes, execution of the original program code 908 then executes at "ProgStart" 906. The execution of the virus code may operate silently, without any noticable effect by a user, and may thereby continue undetected for some period of time.

A program infected as shown in FIG. 9B may be disinfected, by resetting vector 902v back to the program start location 906, and optionally by removing the virus code 912 from the end of the program. That operation is typically undertaken by an anti-virus program, which operates as conceptually shown in FIG. 10. An anti-virus process 1000 has accessible thereto a fingerprint database 1002, which contains information to detect viruses written to files and optionally configuration to conduct disinfection operations on infected files. At periodic times, the anti-virus process 1000 scans a file system 1004, by reviewing files 1006a-n stored thereto. Each file is successively scanned against the fingerprint database 1002, and appropriate countermeasures are taken against detected infections. (An anti-virus program may not actually scan every file, but rather only those files which are possibly executed by the operating system.)

In the past, anti-virus software has successfully prevented many intrusions, resulting in the prevalence of anti-virus software today. Anti-virus methods, however, are limited in the number of intrusions for which protection is feasible. The object of a second type of intrusive attack is depicted in 9C. In this attack, no attempt is made to infect executable file 900. Rather, the entire file is overwritten with a new file 920, which contains its own jump vector 922, data 924, program start location 926 and code 928. New file 920 may be fashioned to include the functionality of program 900, with additional "back-door" functionality permitting an intruder to gain access (such intrusive programs are sometimes called "rootkits"). Although an anti-virus program might detect the intrusion, it cannot restore the original executable file 900 by resetting a vector and removing the intrusive code. Rather, the original code and file must be entirely restored. Although in theory an anti-virus program might perform this restoration, the number of executables produced for any popular architecture is large; a restoration database is thereby practically impossible to distribute. Upon detection, the user is left to restore the executable file from a backup copy, or repeat the installation steps for the application and/or operating system.

The last intrusive type, becoming more and more common, relies on a user to install a software package to a computing system. The user may be deceived into installing an application with intrusive functionality. For example, spyware programs may scan (or "mine") a hard drive for account numbers or passwords that can be used by identity thieves to steal money or information. Other spyware programs may record a user's keystrokes, websites visited, or other information that might be used to a third-party's advantage. Because these applications are installed overtly, with the permission of the user, detecting and countering these intrusions may be especially difficult. Even worse, if an application is provided by the Internet, it may be changed frequently by the author to avoid detection by common fingerprint methods, thereby becoming stealthy to anti-viral software.

Presently, there are a number of organizations, including anti-virus software makers, operating system makers and governmental bodies, that watch the Internet for newly discovered exploits and intrusive programs. These "counter-intrusive specialists" have helped a great deal, producing patches for software and creating or updating anti-intrusion software programs. These programs and patches, however, take time to produce, usually within a period of weeks to months. This delay subjects users of the Internet to the risks of newly released intrusive programs, for which an adequate solution has yet to be found.

BRIEF SUMMARY OF THE INVENTIONS

The inventions relate generally to protection of computing systems by isolating intrusive attacks into layers, those layers containing at least file objects and being accessible to applications, those layers further maintaining potentially intrusive file objects separately from regular file system objects such that the regular objects are protected and undisturbed. Also disclosed herein are computing systems which use layers and/or isolation layers, and various systems and methods for using those systems. Detailed information on various example embodiments of the inventions are provided in the Detailed Description below, and the inventions are defined by the appended claims.

BRIEF DESCRIPTION OF THE DRAWINGS

FIG. 3 illustrates components of a particular layering computer system.

FIG. 4 illustrates components of a layering computer system at simple organizational level.

FIG. 5 shows a simplified method for performing read file system operations using a layered computing system.

FIG. 6 shows a simplified method for performing write file system operations using a layered computing system.

FIG. 7 shows a simplified method for performing registry operations using a layered computing system.

Figure 1:
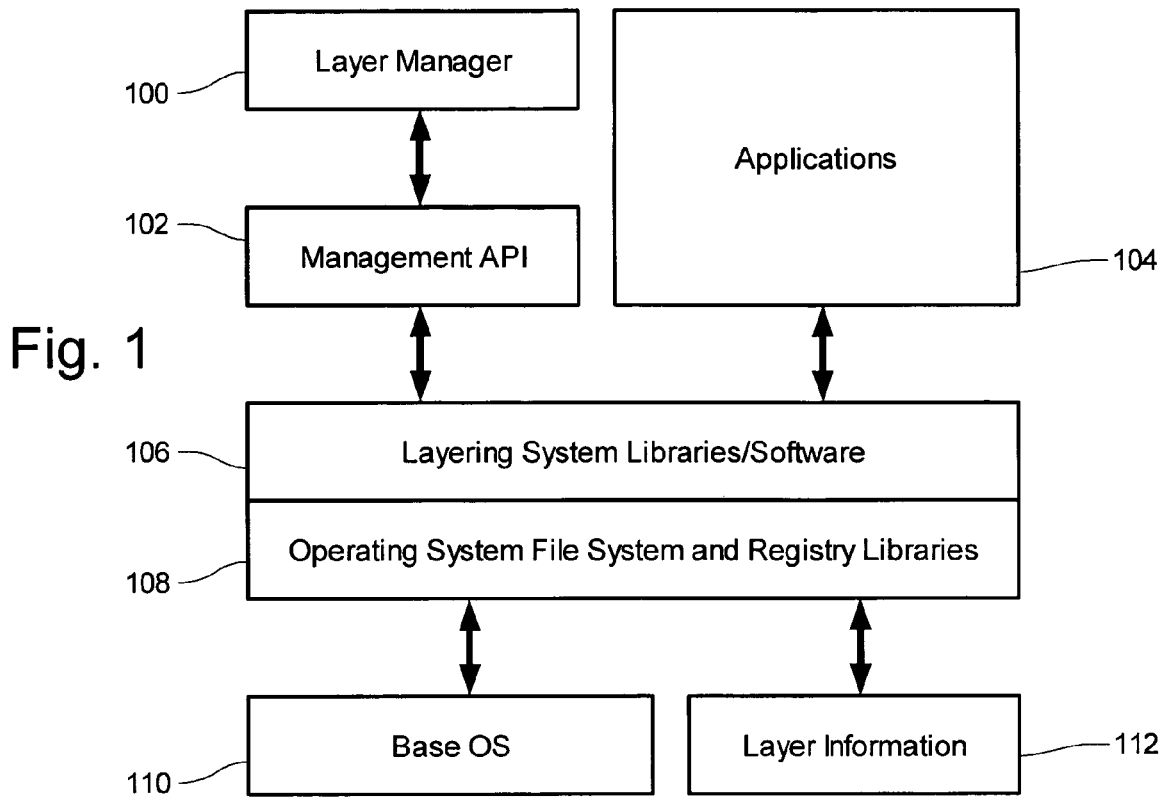
FIG. 1 illustrates components of a layering computer system at a conceptual level.

Reference will now be made in detail to some embodiments of the inventions, example of which are illustrated in the accompanying drawings.

DETAILED DESCRIPTION

General Concepts

For the purpose of simplifying the discussion herein, several examplary computing devices are referenced. Those devices are typically a conventional personal computer or workstation having a CPU, memory, display, keyboard, mouse, and at least one fixed disk. It will be apparent to one of ordinary skill in the art that the concepts disclosed herein may apply equally to other computing systems that are not personal computers, for example diskless workstations, headless workstations or servers, embedded systems and many other types. Herein it is contemplated that the inventions may be applied to these and other computing systems, both existing and yet to be, using the methods and principles disclosed herein.

Likewise the discussion below speaks of registries and registry settings, which are specific to Microsoft Windows™ operating systems. It will be recognized that registry settings are merely configuration for the operating system and applications installed to a computing device, accessible through a system-wide API. The meaning of registries and registry settings is therefore extended to future Windows operating systems and operating systems other than Windows, where equivalent structures and access facilities exist thereon.

In the discussion below, the words "enabled" and "activated" are used interchangeably to describe layers that are active or enabled on a layering computing system. Likewise, the words "disabled" and "deactivated" may be used to describe layers that are not enabled or active.

Generic Layered Systems

Provided in one aspect of the invention are application layers which are isolated from other applications on a computer. In that aspect, an application layer may be defined to be a group of files in combination with any associated application configuration stored to operating system files. An application of a layered system may be an application in the most commonly used meaning, such as word processors, browsers, system tools, games, and the like, or may extend to other software installed to a host providing an environment, such as a graphical user environment or shell. It will be seen that isolating application files and configuration in a layer provides several benefits, including the ability to delete, disable, and enable applications in a simple way and to provide a barrier between applications which may use conflicting configuration or library files. The use of a layering system may therefore enhance the stability, reliability, usability and security of a computing system.

A layered system introduces a new concept of organizing data from disparate sources and presenting a virtual view of that data to an operating system and a user. This permits the real data to be much more logically organized while still presenting to the operating system and the user an expected view and access of that data. In a sense, a layer is a higher order storage unit. Because a layer can be managed as a unit for the purposes of exporting, importing, enabling, disabling, and so on, a computer system and user data can be managed with a greater degree of flexibility and reliability, also with improved security. As changes to a layered system are made, the changes are organized while being written, rather than merely tracking the changes made. By doing this both a speed penalty and the dedication of large amounts of storage for images and changes are avoided.

Depicted in FIG. 1 are components of a layering computer system at a simple conceptual level. A base operating system 110 forms a platform with which applications can be run and files can be accessed in file systems. Base operating system 110 further has registry settings, globally available to applications for reading and writing. The system has libraries 108 for executing the functions of the operating system including operating file systems and registries, and other operating system functions. Tied into libraries 108 are layering system libraries and/or software 106 which intercept file system and registry accesses from applications 104. As accesses are received from applications 104, the layering system software 106 performs computations to determine whether the accesses should be permitted to continue to the base operating system 110, or should be redirected to layer information 112, the information relating to and the contents of files and registry settings. A layer manager application 100 may be provided to permit control and configuration of the layering system software 106 through a management API and library 102.

Figure 2:
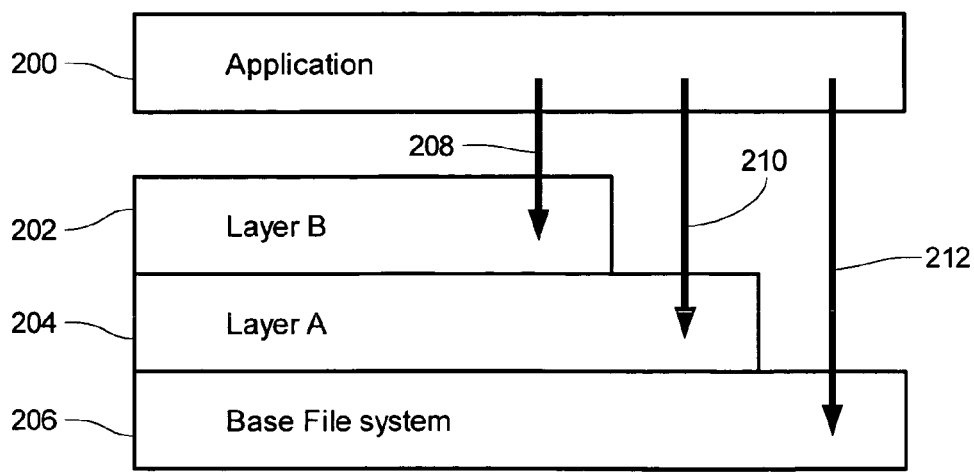
FIG. 2 illustrates an operation of a layering computer system at a conceptual level.

Depicted in FIG. 2 is the operation of a layering computer system at a conceptual level. An application 200 is running on a layered computing system. This computing system contains a base file system 206, and two layers labeled "A" and "B", 204 and 202 respectively. In this example layer B has priority over layer A, which in turn has priority over the base file system. A first file access 208 is made by application 200. The layered computing system determines the owner of the file being accessed. Finding an entry for file access 208 in layer B, the corresponding file in layer B is opened and returned to the application. The file access of 208 might also correspond to files in layers A or the base file system, however layer B is determined to be the owner as it has priority over layer A and the base. Another file access 210 is made by application 200. The computing system does not, however, find a corresponding entry in layer B. An entry is found in layer A, which has priority over the base file system. Again, if a file existed in the base file system corresponding to the file access, the file reference in layer A would be accessed because layer A is found to be the owner with priority. The computing system is not able to find corresponding entries in layers A or B for file access 212, so that access is made to the base file system.

In FIG. 4 components of a layering computer system at simple organizational level are shown. A computing device includes a processor 400, which may also have peripheral devices attached such as memory, input devices or output devices as desired. Processor 400 interacts with one or more storage devices 402, providing storage for the processor. On storage 402 is a base operating system 408 and applications 410. A number of layers 404a-n are also contained on storage 402, each having applications 406a-n.

In larger aspects, a layer may be defined to be a set of file system and registry changes, that combination forming an organizational unit that may be managed by layered system software. In some cases, a layer need not contain registry changes, but only changes to one or more file systems. In those cases it may be desirable to limit support in the layered system software to files of file systems. A layer definition may include layer properties and settings, layer inclusive files, references to those files, registry settings and locations, and a manifest or directory those file and registry references.

References may be made inherent, if desired, by locating files and registry settings in a structure that mirrors a real underlying file system. Such a mirroring system may be organized in a common directory, with one subdirectory per defined layer, each containing a mirrored directory structure of the underlying file system.

An exported layer will contain all of the layer-included information bundled in a transportable archive. Exported layers may be further bundled into groups, which is especially useful for layers that rely on other layers, such as layers of a hierarchy or peer layers. For systems that utilize a mirror structure of an underlying file system, it may be desirable to hide the mirror structure from applications, except perhaps a manager application, so as to prevent accidental data modification, loss, or meddling.

A layer intending to isolate a host-installable application has stored thereon the files and directory structure of the application's installation, as they would have been installed to the base operating system. When that layer becomes mounted (or enabled), those application files and directories are shadowed or overlaid over the regular operating system file system. Shared libraries (such as DLLs), system accessible configuration (such as registry entries), and version control are managed by the layering subsystem, optionally using an internal database. Though each layer is a separate and individual entity within the host OS, the application files, data, and system accessible configuration are presented as if they resided in their respective ordinary locations. Thus an application stored in a layer appears to the host OS as if it were installed in the ordinary fashion with the expected functionality.

For example, suppose a layer existed in a Windows OS environment that specified that in C:\windows there should be a file called winfile.exe. Also suppose that a file of this name did not reside in the true C:\windows directory. When the layer is not active, a file listing of C:\windows does not show a winfile.exe. When the layer becomes active, the layering system merges (or overlays) the true listing of C:\windows and the file list described in the layer. In this example, applications (and thereby a user) would see all of the files in the true C:\windows directory and winfile.exe. Registry values in a layer may be handled in a similar manner.

Shown in FIG. 5 is a simple method for performing read file system operations using a layered computing system. A loop is entered beginning at step 500. Execution halts in step 502 pending the receipt of a read request. A determination is then made in step 504 as to whether or not the file reference of the request is maintained in an enabled layer. To perform that determination all the layers on the system are generally examined for a virtual file corresponding to the file reference of the request. If no enabled layer contains such a virtual file, step 506 executes in which the usual read operation is executed using the file reference of the request. Otherwise, an owner layer is identified in step 508. For example, if two enabled layers contain a virtual reference to a file, one will take priority over the other and be identified as the owner layer. Step 510 then executes, in which a virtual file reference is determined that corresponds to the file reference of the read request. That virtual file reference might be an offset and length for a storage device in some systems, a pathname at a mirrored location in other systems, or other reference. Afterward, the read operation is executed using that virtual file reference in step 512. The procedure of FIG. 5 may also be modified to consider ownership first, examining enabled layers in order of an ownership preference to promote efficiency.

FIG. 6 shows a simple method for performing write file system operations using a layered computing system. A loop is entered beginning at step 600. Execution halts in step 602 pending the receipt of a write request. A determination is then made in step 604 as to whether or not the file reference of the request should be captured to an enabled layer. That determination may be made, for example, by noting the state of the system software is in a capture state, and in some circumstances by noting the PID of the calling application and parents. If no enabled layer is configured for capture, step 606 executes in which the usual write operation is executed using the file reference of the request. Otherwise, a capture layer is identified in step 608. Step 610 then executes, in which a virtual file reference is determined that corresponds to the file reference of the write request. That virtual file reference might be an offset and length for an unused portion of a storage device in some systems, a pathname at a mirrored location in other systems, or other reference. Afterward, the write operation is executed using that virtual file reference in step 612.

The read and write operations spoken of in the discussion of FIGS. 5 and 6 may be performed on some systems through an open( ) call. A read request, for example, might be a call to open( ) with a pathname as a file reference and "r" as an option. Likewise, a write request might be a call to open with "w" or "+" as an option. In either case, a file handle is returned which would correspond either to a true file reference (if the file reference is not managed in a layer) or to a virtual file reference (if the file reference is managed in at least one layer). That file handle will continue to be used in data read and write operations, and thus the data will be delivered to and from the correct system locations. Other systems may use other equivalent methods of opening, reading and writing, and applicable using methods similar to those described herein.

FIG. 7 shows a simple method for performing registry operations using a layered computing system. The method begins at step 700, following which a pause is executed at step 702 until a request for registry setting operation is received. When a registry setting request is received, step 704 executes in which a determination is made as to whether or not the request is to be captured to an enabled layer. If not, step 706 is executed in which a usual registry function is called, as if layering were not present in the system. Otherwise, step 708 is performed, in which a destination layer is identified. Step 710 tests the request for a registry entry creation request. If a creation request was received, step 712 executes in which a virtual registry entry is created in the destination layer. Otherwise step 714 is performed, testing for a registry entry deletion request. If positive, step 716 is executed in which either a virtual registry entry is deleted, if the entry exists in a single layer, or a delete entry is made in the virtual registry of the destination layer signifying that the registry entry should not appear while that layer is enabled. If the request is neither a create or delete request, step 718 is performed testing for a set registry entry request. If positive, step 720 executes creating a virtual setting in the destination layer.

As in the above example, layers may contain file and registry deletion references. Those references may be used where a layer specifies the absence of a file or registry setting, whereby a specified file or registry setting will appear to be absent from the computing system only when the layer is enabled.

Figure 8:
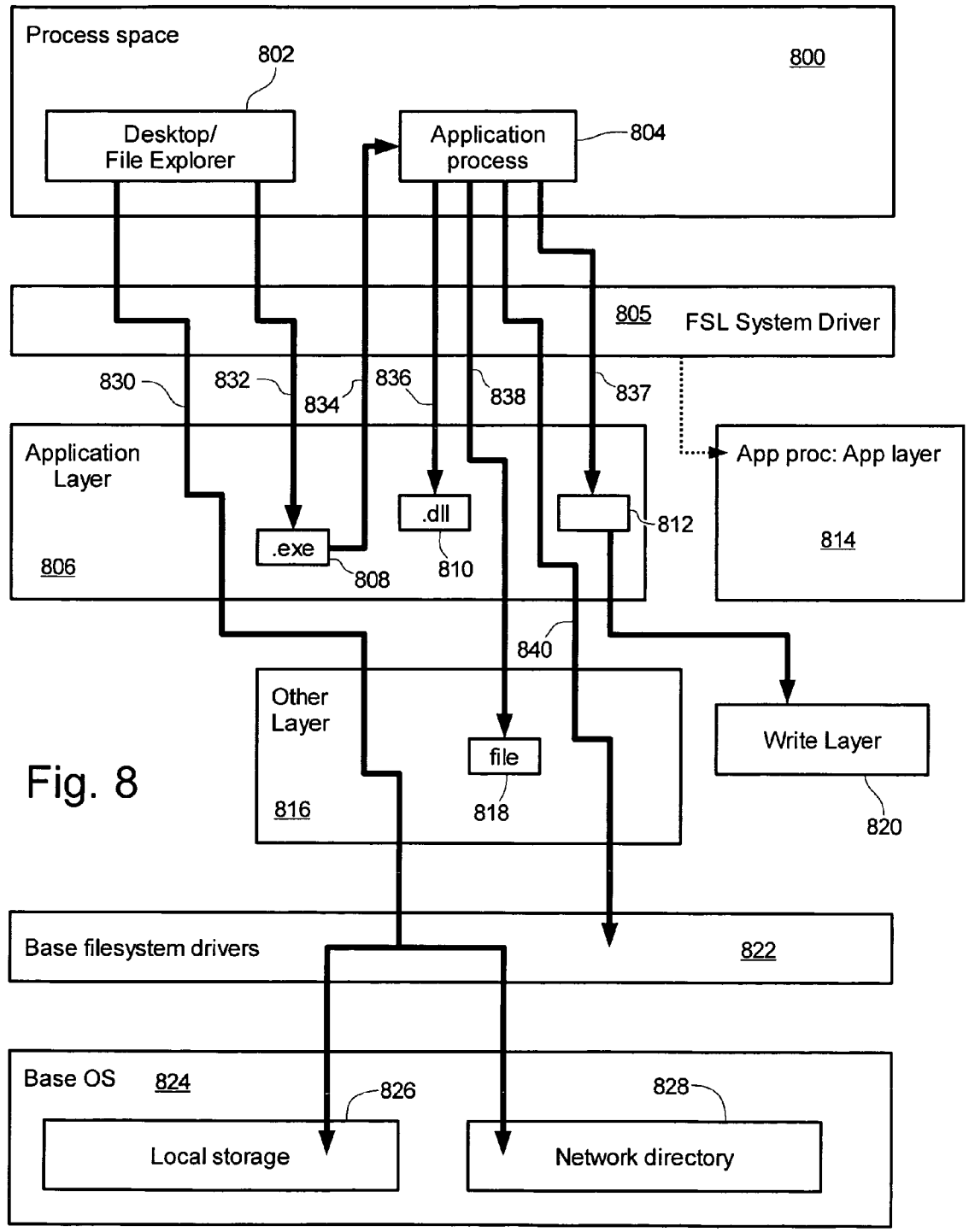
FIG. 8 depicts a flow of operation for an examplary layering system supporting application layers.
Figure 9A:
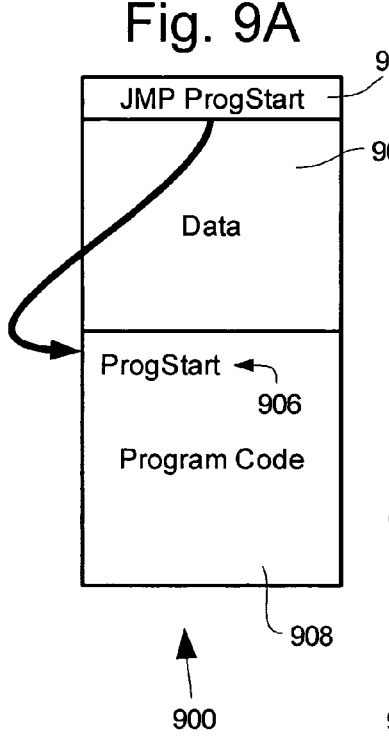
FIGS. 9A, 9B and 9C depict the effects of several intrusions on an executable file.
Figure 9B:
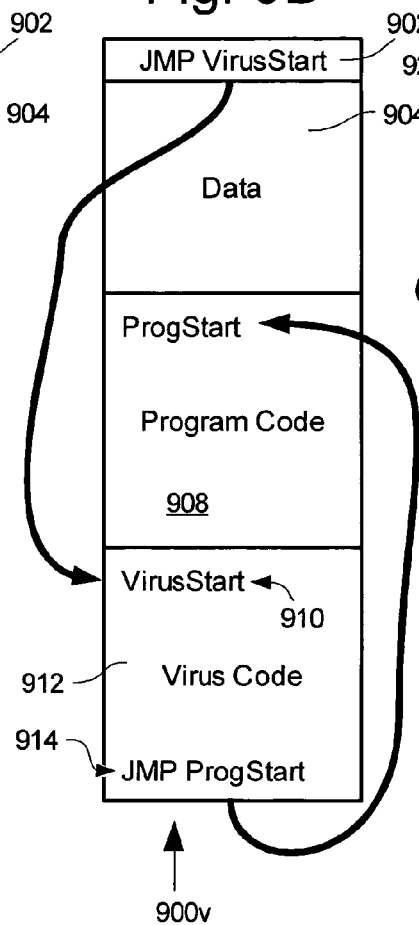
Figure 9C:
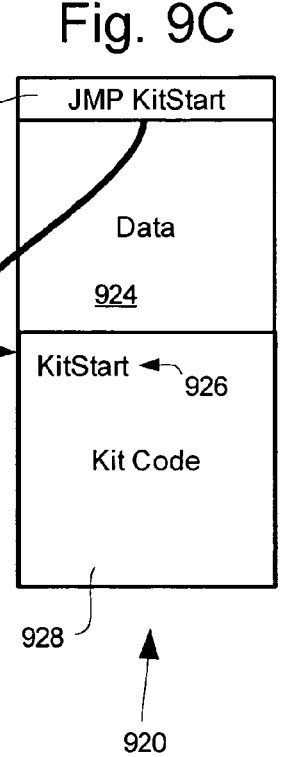
Figure 10:
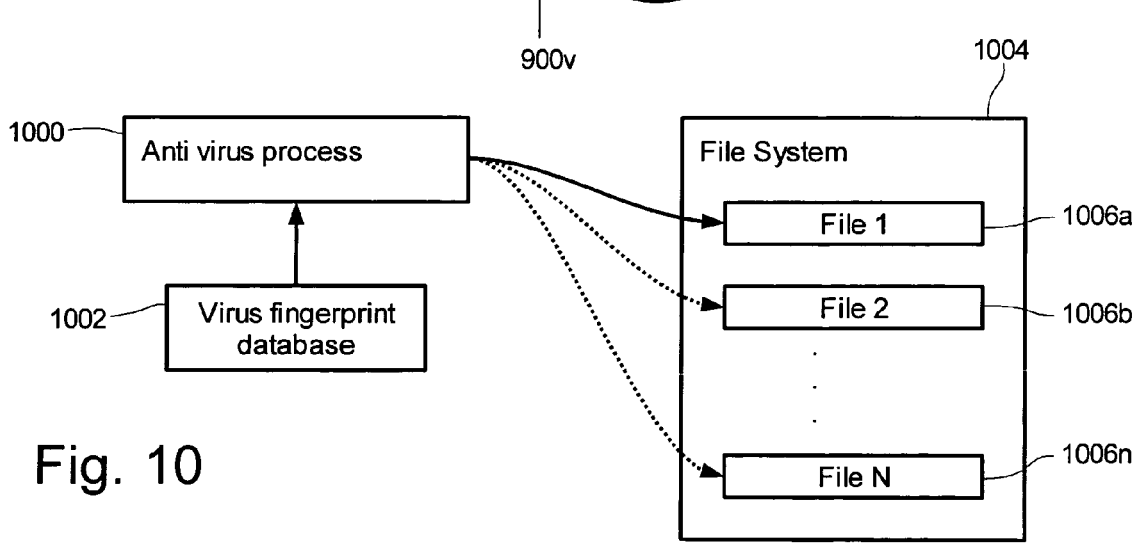
FIG. 10 conceptually illustrates the operation of an anti-virus program.

Referring now to FIG. 8, a flow of operation is depicted for an examplary layering system supporting application layers. In the discussion below, references to files will be spoken of. References to a registry, for example a system registry, may be treated similarly to file references by including processing for registry entries in addition to file entries.

A base operating system (base OS) 824 provides facilities for interactions with files stored to local storage 826, which for example might be a hard disk drive, and optionally to a network directrory 828, with those files generally being presented similarly as with files on local storage 826. Base OS 824 includes base filesystem drivers 822, which may be integral to the base OS or might be modular in nature, and provides file access to applications running under the base OS 824. A layered driver 805, in this case an FSL system driver as described below, is installed to provide access to layers as will presently be described. Further in this example, an application layer 806 is enabled for use by the system by way of driver 805 to provide access to files contained in the layer. Another layer 816 may also be enabled.

In the example of FIG. 8, a file explorer application 802 is provided with base OS 824. The file explorer may make requests for directory listings and for file accesses. In a first access 830, the desktop application requests access to a file reference by using the usual procedure calls. On installation, the layering driver 805 has modified the destination of those procedure calls so that it may process them prior to processing by the base OS drivers 822. First access 830 is first reviewed by the layering driver 805 by reviewing application layer 806 for the presence of a file entry matching to the access reference. For the first access, a match is not found and the access is permitted to progress. If other layer 816 is enabled, it is in turn searched for a matching file entry, in this example after application layer 806 due to the secondary priority placed to other layer 816. If after searching the enabled layers the layering system drivers 805 finds no entry matching the first access reference, the first access is permitted to follow the normal route of access through the base filesystem drivers 822, which may result in a file access in local storage 826 or network directory 828.

A second file access 832 is made from explorer 802, this time in the form of a command to execute a file, for example by a user double-clicking on an icon. For access 832 an executable file entry 808 is located in application layer 806. The locating of entry 808 results in a corresponding virtual reference, which is used to reference the data corresponding to the file entry. That data is loaded into RAM 834 and executed, resulting in a new application process 804. Layering drivers 805 notice that application process 804 is started from application layer 806, and make a relation 814 of that process to the layer from where it came, for example by referencing the PID of application process 804. The execution of application process 804 results in a request to load a library, which in turn results in a file access 836 for a "dll" file. Layering drivers 805, utilizing the relation 814 made earlier, detect that application process is related to application layer 806, and first looks for the file reference in the application's layer 806. The layering driver 805 finds an entry 810 for file access 836 in the application layer, the file entry 810 referencing a library specific to application process 804. That library is loaded into memory using the same procedure as the ordinary procedure provided by the base OS 824, with the exception that the read calls are redirected into layer 806 using a virtual reference.

Application process 804 makes a read request 838 for an additional file. No entry is found in related application layer 806. The layering drivers continue to search for a file entry corresponding to the reference in other layer 816, where a file entry 818 is found to match. The data of that entry is delivered to application process 804, even though the file entry is located in a different and lower-prioritized enabled layer. In a third file access 840 layering drivers 805 find no corresponding entry in enabled layers 806 and 816, and pass that access to the base filesystem drivers 822. A fourth file access 837 is an access to write to a file. In the example of FIG. 8, a write layer 820 is enabled to capture changes that would have been made to unprotected areas of accessible filesystems, for example the base operating system or a protected layer. Also in this example, application layer 806 is configured as a read-only layer and a file entry 812 exists in that layer for the write reference 837. Layering drivers 805 do not carry the write operation to file entry location 812, but rather create a new entry in write layer 820 for the written data, or modify a corresponding pre-existing entry in the write layer 820. Write layer 820 is prioritized over application layer 806 by the layering driver 805 to read modifications to a file reference first rather than the file data as originally created in the application layer.

The above exemplary layered system is an example of a public layered system. In that type of layered system, applications not stored to a containing application layer may be given access to its contents. Thus processes such as explorer 802 can access the contents of application layer 806. In contrast, a "layered" system may be constructed with a private context. In that type of system, the contents of "layers" are made available only to a particular parent process, which might be a wrapper application that bootstraps drivers to intercept file accesses from processes started from a particular layer. Private context systems, however, do not permit applications generally to access the files within those "layers." A file explorer, for example, could not "see" into a private contextual layer either to execute an application or to access data files within. The contents of such a "layer" are thereby sandboxed and isolated from most if not all other applications on the computer. Additionally, because those layers are sandboxed from other layers, the stacking of layers is not possible; the choice of layers in a private context system is therefore simplified to relations between a wrapper application, it's child processes and the "layer" it is associated with.

A public context layered system, by contrast needs no wrapper applications to access and/or execute the contents of layers, as those contents appear to all applications generally (provided access to the layers is not restricted, for example by encryption). Additionally, several layers can be presented on the system at the same time to applications generally, which provides flexibility in the creation of layers and layered application frameworks. Most apparently to a user, the contents of a layer become immediately and generally accessible upon enablement of the layer without additional steps and complication.

The use of a layering system as given above provides several advantages. If applications are stored individually in layers, interactions between application files may no longer occur due to conflicting shared libraries (DLLs), as each application 'sees' only it's own installed libraries first, followed by libraries in the base operating system, those base libraries optionally preceeded by libraries from other layers if desired. Applications captured in a layer may be safely and completely uninstalled by simply removing the layer from the host computing system. Different versions of an application may be stored as layers on a single computer; the user may select a desired version by enabling the particular layer. A layering system may also extend the file systems of the OS beyond physical limits if layers are stored on separate disk partitions or remote file systems. If layering is used for a group of installed applications, the computing system may be restored to a "virgin" or checkpoint state by removing one or a group of application layers. The transfer of applications between similar computing systems can be simplified, in that the transfer may be done simply by moving or copying the layer containing the application. The bundling of an application and user files into a layer provides a package that may be compressed or encrypted and transported conveniently. Using a layering system application vendors can provide 'pre-installed' applications as layers on CD-ROM or other media, those applications being pre-tested and guaranteed to work with a high reliability. A layer also provides a convenient container to limit access to an application, for example for time limited use or license key access.

In some preferred systems, the enablement and disablement of layers is performed through a system call. The system drivers control the access of applications to the file system through the enabled layers, generally without requiring significant access to the system disk or other storage. In those systems the installation and de-installation of an application can be as simple as enabling or disabling a containing layer, without requiring the installation or removal of the applications files from a hard disk. In those systems, time consuming snapshot utilities become unnecessary.

In one preferred system, layering only applies to files located to fixed disks and network drives, each layer spanning one or more fixed disks. In that system removable disks should not generally be layered, as a layer generally pertains to the persistent files and configuration required to operate an application or user environment. It is expected that under most circumstances user files should be permitted to be saved to a floppy disk or CD-RW, for example, so a user can transport his data files to another computer. Likewise, areas on a fixed disk may also be reserved for user or other files to be excluded from layering, for example a "my documents" directory, as desired.

In some systems it will be advantageous to distinguish layers into a "read-only" and "read-writable" portions, the read-only portion containing files and configuration as originally installed and the read-writable portion containing additions, deletions and modifications to the original installation. In some circumstances these layers may be referred to as the install portion (read-only) and the user (read-write) section. A read-writable portion may be global to all users of a computer. Alternatively a read-writable portion may be provided for each user of a computer, each read-writable portion being protected from access by other users.

Some systems may provide a multi-user environment providing a facility for an administrator to designate layers accessible to individual users and another facility to automatically enable layers on user login and disable layers after a user has logged off. In those systems an administrator may provide layers accessible to all users or some users. Other layers may be provided accessible only to an individual user. In a subset of those systems a writable layer is provided for each user, providing data protection and isolation between users.

A single layer having a read-only and a read-writable portion is equivalent to two layers, one of which is write protected. In alternate systems, read-only and read-writable layer portions are individual peer layers; those layer definitions containing a reference to the accompanying peer layer.

In some layered systems, layers may be stacked on top of each other, with the true file system at the bottom of the stack. If files of the same name and location exist in multiple layers, or in the base file system, rules can be provided whereby the layered system can determine which file to present to an application. In some systems, layers include dependency information. That dependency information may include a list of layer identifiers which are required to be enabled when a particular layer is enabled. Dependencies may be asserted when a layer is created, by recording the layers enabled on a layered system at the time of layer creation. The layering system software may automatically enable all dependent layers when a particular layer is enabled.

For ease of configuring and managing a layering system, a manager application may be provided. The manager application permits an administrator or user to control the presentation of applications and data on a system, as well as other functions. A manager application may have facilities for importing and exporting layers, using a standard layer archive format. That archive format will advantageously be compressed, and may use standard archiving formats, for example those used by 'zip' or 'tar' type applications. A manager application provides a logical place to contain a facility for changing layered system software settings. A manager application might provide a viewer to view information about a layer. Likewise, a layer editor may be provided to edit certain layer information as desired. An editor might also be provided whereby registry settings and files can be added, removed, or changed in a layer. A facility for selecting, enabling, and disabling layers and layer groups may also be provided. Likewise, a facility for defining and editing layer groups may be included, as well as layer dependency information. A facility for deleting and installing layers may also be provided in that manager application. That application may also include an interface to cause layered system software to enter and exit capture modes.

It may also be desirable to provide a startup layer enablement function, whereby the computing system starts up a group of layers based on layer configuration. This will be especially helpful where it is desired not to provide users with non-layered access to the underlying file system and registry, for example in public settings.

It may optionally be desired to include variable handling with regard to file system paths and registry paths. The location of a file or registry setting specified in a layer may include one or more variables, so as to permit relocation of that object. A variable may be denoted in many ways, for example by surrounding the variable name with percent "%" characters. The source of some variable names and values may be from the environment. For example, Windows operating systems set the "WINDIR" environment variable to the location of the OS system subtree, for example C:\windows. Including the WINDIR variable in a path may permit files of a layer to be moved from one Windows system to another, especially if the OS system subtree resides in different locations on the computers. Other variable values may be supplied at runtime, for example a "CURRENTUSER" variable. In that example, the CURRENTUSER variable is set to a user's login name while that user is logged in. One use of the CURRENTUSER variable is to provide a layered file reference for a global file that appears in each user's profile directory. Yet other variable names and values may be stored in a layer definition. A manager application may provide editing facilities for changing those layer-defined variables, and for editing the pathnames of virtual files.

Layer Creation Modes

Layer creation modes may be provided in a layered system to create new layers through a "capture" operation. A capture operation is generally started and ended, and uses the layering software to intercept operations that install, delete, rename or modify files and configuration such as a registry. If the layering system supports layers having both a readable and read-writable portion, the capture operation may record changes to the readable portion; that readable portion becoming effectively locked when the capture operation is ended. During the capture operation changes made by the installation procedure do not affect the base system, but are rather recorded to the new layer.

A first layer creation mode is simply called "capture" mode. When that mode is enabled, all operations by any application to create, modify or delete files are entered into a layer. This mode is especially helpful in situations where it is desirable to create a new layer for one or more applications to be installed to the computing system. In an example of a capture mode operation on a Windows platform, a user first enables capture mode. The user then executes an application installation program. During the install, all of the applications shared DLLs, registry entries, and .ini files that would be directed to the Windows system directories become trapped in the capture layer. Application files that would be placed on file systems managed by the OS are also redirected into the layer. All of the captured data is held separate from the regular OS either locally or remotely in a data file, hard disk partition, or some other container.

A second layer creation mode is referred to as "capture by PID" mode. That mode is similar to "capture" mode, with the difference being that only changes made by a particular process ID (PID) or one of its child PIDs are captured.

A third layer creation mode is called "delete capture" mode. This mode may be thought of as the inverse of "capture" mode. Delete capture mode is intended to track all of the file system and registry deletions that occur and place those files and registry entries into a new layer. The software (driver) is hooked into the system so that operations that delete, rename, or modify file system or registry so they can be copied to the capture layer before they are modified. This mode may be particularly helpful to create a layer of an already installed application. The user enters "delete capture" mode, following which the user activates the application's deinstallation program. As the application's uninstall program removes files and registry settings, they are copied to the new layer. When the uninstall is complete, the user exists delete capture mode. At that time the application does not exist in the regular file system or registry, but can be activated by the user as it appeared before the uninstall operation by activating the newly created layer.

A fourth layer creation mode is called "delete capture PID" mode. That mode operates in similar fashion to delete capture mode, with the difference that only changes made by a particular PID and child PIDs are tracked, rather than system-wide changes.

A system supporting layering need not implement a capture mode if an alternate layer delivery mechanism is provided, for example a layer import operation or a simple file or file system copy.

Use: Application Installation Generator

Many application installer programs have the ability to create an application install via a "capture" or "snapshot" process. This process typically involves comparing the state of the computer system before and after an application install and generating the install information based on the differences. In a system supporting layers, an application may be captured as outlined above, creating an installation layer. Because changes are tracked as they occur, no state comparison needs to be done, saving time. In addition, it is usually recommended that the "capture" operation be performed on a "clean" or "virgin" system, so the capture process can capture all the necessary system changes (i.e. won't miss changes due to application pieces being left over from prior installations.) This requires the user to reinstall the operating system to get the system into the desired clean state. A layered system may be made clean by disabling all layers created during installation capture procedures (assuming all install operations have occurred under capture operations.) After capture of an installation layer, that layer can be used to install the application at another computer supporting layers, or the information can be extracted from the layer to provide a file manifest for other installation programs.

Use: Software Installation/Uninstallation

Layers can be advantageously used to provide an installation for an application that is relatively easy to uninstall. A software vendor builds an application CD (or other media), first using a capture mode to record a layer of the application installation. That layer is then exported to a file, which file is then combined with an installation program for the layering system software, for example to a compact disc. The compact disc will contain an installation program, which for example might be called 'setup'. The setup program operates first to install the layering system software, and then import the layer exported to the compact disc into the destination system. At that point, the subject application is then installed to the destination system, but isolated in a layer. Because it is isolated, it is protected from corruption from other applications or meddling, and thus it remains in a known and reliable state, potentially reducing the number of technical support calls.

It is probably desirable to include a banner screen advertising the layering system software product and providing contact information for product inquiry and support. It may also be desirable to include a layer manager application with the layering system software to allow a user to enable and disable the application layers or other installed layers, but that is not necessary for a simple demonstration product.

As the application is used, it may be desired to record changes to the virtual file system into the writable portion of a layer. Alternatively, it may be desirable to record some user files to the underlying file system so those files could be retained if the application layer was deinstalled or removed, as might be the case for word processing files, CAD files, etc. The software installer may be given the option to record the software installation of an application layer into a readable-only portion, so the user cannot inadvertently or otherwise damage the application installation.

At some point, it may be desired to remove the application. To do so, the user removes the layer from his computer, which deinstalls the application and any files or changes made to the virtual file system. Uninstalling the layering system software is optional, as the presence of that software would not adversely affect the use of the destination system.

Through that method, software creators may create a demo version of their software. These versions might be used to give the end user experience with a software product before a purchase is made. The advantage of removing changes to the virtual file system is significant, as many applications do not uninstall cleanly and leave residual files and changes.

Optionally, functionality might be built into the layering system software that disables the application layer after a period of time. After such a disabling, a user would have the option of removing the application layer, or purchasing a license for use of the application. The license would presumably be accompanied with a license key or other authentication feature verifiable by the layering system software.

In another alternative configuration, an application layer is never transferred to a resident fixed disk, but rather remains resident on the vendor product, compact disc or otherwise. In that configuration the application layer can only be activated if the vendor product is readable in a media drive, and little or no space is taken on resident file systems for the application installation.

Use: Secure Applications

Applications can be protected from unauthorized access through the use of a layered system. In a first situation, it is desired to protect application files from viewing and copying, for which one solution is described. The layering system software of a suitable system has an additional feature by which a layer may include an authentication key or token. Any application of the computing system desiring to open files within the layer must supply a token to the layering system software before access is allowed. The PID of an authenticating application may be tracked so that only one authentication step is required. The application layer may additionally be encrypted, the layering system software performing decryption and encryption steps at runtime as the application layer is accessed. That system is advantageous in that only the data of a particular application need be encrypted, reducing the complexities of bootstrapping into an encrypted file system and modifying system applications to support encrypted system files.

In that system authenticating applications will have access to the application files, but not applications not having a valid authentication token. The authenticating applications can be constructed such that limited access is permitted to the application files, as desired by the programmer. For example, an application may store a license key to one of the application's files. If access were permitted to that file, an unscrupulous user could copy that license key to a second computer providing illicit access to the application software stored thereon. The authenticating layered system software is installed to the computer, and an application layer is constructed and installed to the computer, that layer encrypted using a key constructed with information specific to the computer, for example a volume label or Ethernet MAC address. A second application installed to the computer, for example Windows Explorer, cannot view the application layer files because it does not possess the correct authentication key. A user is thereby prevented from copying or otherwise accessing the application files, providing security for the software vendor.

In a second situation, it is desirable to protect the software from execution by unauthorized individuals. In that system, the layering system software has a facility for authenticating a user before enabling a layer.

Other Uses

Another use for a layering system is to have layers that represent different environments on a system. For example, a user could have an Office and a Gaming layer, each providing an environment with it's own icons and menus.

In another use, multiple versions of a software product are installed on a computer, each isolated in a layer. A user may enable a particular layer and use the corresponding version of the software product without having to de-install and re-install the application. This use may be especially helpful where an older version of a software product supports a function desired but not supported in a newer version, for example, the importation of older word processing file formats. This use would also be useful to software product testers, who in the course of testing verify software functionality against multiple development versions. In that use the repeated unstalling and reinstalling or cleaning and reinstalling operations are avoided.

Example Implementation

Example systems are provided of an application layering system under a 32-bit Microsoft Windows architecture, such as Windows 95, 98, NT, 2000, and XP. In those system a layering system is formed by adding several files to the stock Windows operating system, those files including a runtime library FSLLIB32.DLL, a compression/archiving library, and an FSLX driver which is either an FSLX.VXD driver (for 95/98/ME based platforms) or an FSLX.SYS driver (for NT based platforms). The addition of those files is performed using an installation program. The example layering system provides a user with the ability to contain third party application installations into a "file system layer" or FSL. The example system provides the modes of "capture", "capture by PID", "delete capture", and "delete capture PID".

Depicted in FIG. 3 are components of the example layering computer system. An operating system 314 is installed to a computing device, that operating system having subsystems for handling a registry 316 and a file system 318. An FSL system driver is installed "on top" of the operating system 314 in order to have first processing priority for registry and file system accesses. An FSL management application 300 provides an administrator an interface to interact with the FSL system driver 312, change its configuration, and make changes to layers. An FSL API library 306 provides a convenient interface for the management application 300 to attach to the FSL system driver 312. At certain times, FSL management application 300 provides notices to the Windows Explorer 302 notifying that application that the contents of a mounted file system have changed. Other applications 304 may interact with the system, performing read and write operations to the file system and registry, through the FSL system driver 304. A compression library 310 may be provided to compress layer information, especially for layer archives exported by the system.

A "lazy thread" is utilized to perform low priority tasks. That thread wakes up occasionally to delete layers that are marked for deletion and write out delete lists that have changed. The execution of the lazy thread may be deferred for a short time if the system is busy.

In the example systems there is a key in the registry under HKEY_LOCAL_MACHINE\SYSTEM called FSLogic\FSL where registry settings describe each layer and its settings. The SYSTEM portion of the registry is used because it is available very early in the boot cycle. Each layer has the properties outlined in the following table:

| Property/Value | Meaning/Function |
| --- | --- |
| Active | Non-zero indicates that the layer is enabled |
| ActiveOnStart | Non-zero indicates the layer should be enabled when the FSLX driver loads. |
| FileRedirect | The path to the location in the file system that contains the file system virtual files. |
| MajorVersion | The major version of the layer format. |
| MinorVersion | The minor version of the layer format. |
| Peer | The name of the peer layer. |
| ReadOnly | Non-zero indicates that the layer is read only, or the readable portion of a peer layer combination. |
| RegRedirect | Path to the location that contains the virtual registry settings for the layer. |
| Type | Layer type. |
| ShouldDelete | Non-zero value indicates that the layer should be deleted. This value is read by the lazy thread to know if the layer should be deleted. |

Also under HKEY_LOCAL_MACHINE\SYSTEM under a key called fslrdr is kept all registry information contained in each layer. Under fslrdr there is further a key for each layer defined in the system. Under each layer key each of the HCC, HCR, HCU, HLM, and HU keys are present. These keys correspond to HKEY_CURRENT_CONFIG, HKEY_CLASSES_ROOT, HKEY_CURRENT_USER, HKEY_LOCAL_MACHINE, and HKEY_USERS respectively. The structure of the registry under these keys mimics the regular structure of the system registry.

When a layer is active, all of the keys and values for the layer are overlaid on the normal registry. For example, a layer "TEST" is defined on a system and has a registry entry "HKEY_LOCAL_MACHINE\SYSTEM\fslrdr\TEST\HLM\Software\XYZCorp". When that layer becomes active, the following key would appear in the registry: "HKEY_LOCAL_MACHINE\Software\XYZCorp".

The FSLX.SYS and its counterpart FSLX.VXD operate to intercept key file system and registry calls and manipulate the results to create the appearance that virtual files and registry settings contained in the layer definitions exist in the real file system and real registry. When requests come that access virtual files or virtual registry settings, these requests are redirected by the FSLX driver to the proper locations in the layer. The FSLX driver also accepts IOCTLs from FSLLIB32.DLL that control the state of the driver. The following table outlines a set of IOCTL commands available through the FSLX driver:

| IOCTL | Description |
| --- | --- |
| Version Query | Returns the driver version. |
| Begin Capture | Causes the driver to enter "Capture" mode. |
| End Capture | Causes the driver to exit "Capture" mode. |
| Begin Delete Capture | Causes the driver to enter "Delete Capture" mode. |
| End Delete Capture | Causes the driver to exit "Delete Capture" mode. |
| Activate Layer | Activates a specified layer. |
| Deactivate Layer | Deactivates a specified layer. |
| Rename Layer | Notifies the driver that a layer has been renamed. |

For each read or write request to a file system or registry, an owner layer is determined. The owner layer is determined by a sequence of steps. First, if the driver is in Capture mode, the owner layer is the layer being captured. Second, if the driver is in PID Capture mode, and if the PID of the requesting process is the PID being captured or a child PID of the PID being captured, the owner layer is the layer being captured. Lastly, if the driver is not in a capture mode, and if the PID of the requesting process is a PID of an executable whose executable file is in a layer, the owner layer is the layer where the executable file resides.

Because multiple layers can be active at the same time and those layers may contain entries that overlap, rules are defined to determine the order layers are considered by the driver. Different modes require different search rules. If the system is in capture mode, the owner layer is defined to be the layer specified as the capture layer. Otherwise, the owner layer is defined to be the layer that a particular process started from, as may be determined by traversing upward the PID parent/child chain. For example, suppose layer A contained B.EXE. When B.EXE executes, it results in process C running. The owner layer for process C is then layer A.

When the FSLX driver loads, the following is performed: (1) all mutexes and lists are initialized, (2) a device is created used for API DLL communications, (3) a symbolic link that allows for the device object's access from Win32 programs is made, (4) all of the file system entry points are hooked in, (5) the drives to be redirected (C:, D:, etc.) are hooked in, (6) all of the Registry entry points are hooked in, (7) the lazy thread is started.

The FSLX driver uses the following structures and hooks the following entry points in the file system and Registry system code:

Structures used:

FSLX_DELETE_ENTRY_REMOVE: Holds information about an entry on a delete list that may be removed later, for which all necessary information will not be available at the time of removal.

FSLXDELETIONCANDIDATE: Holds information about a file that should be later marked as deleted.

PFSLXOPENREGHANDLE: Holds information about all currently open registry handles.

FSLX_PFO_ENTRY: Holds information about an open directory, the information including a pointer to the file object, a handle to the directory, and the directory path.

FSLX_RENAME_ENTRY: Holds information about a rename operation that is used to create a delete entry.

FSLXREGOPENKEY: Holds information about an open key in a layer, including a handle to the key.

SH_RET_ENTRY: Holds the name of a file. These file names may have already been returned in a query routine. This structure is retained to ensure the same name is not returned more than once if the same file exists in multiple redirection areas.

FSLXSHADOWHANDLE: Holds information about an open directory handle. Among other things, it may contain a list of FSLX_PFO_ENTRYs that correspond to directories in applicable layers.

FSLXSHADOWKEY: Holds information about an open registry key. Among other things, it may contain a list of FSLXREGOPENKEY structures that correspond to keys in applicable layers.

File System Calls:

IRP_MJ_CLEANUP: If there is an FSLX_DELETE_ENTRY_REMOVE structure associated with the parameter referenced File Object, free it. If there is an FSLXDELETIONCANDIDATE structure associated with the parameter referenced file object, add a delete entry for the file and free the structure.

IRP_MJ_CLOSE: Free the FSLXSHADOWHANDLE structure associated with the parameter referenced File Object by: (1) removing the shadowHandle from the list, (2) getting a pointer to the shadowhandle using the File Object, (3) decrement the reference count of the shadowHandle, (4) if the reference count is greater than zero, return success, otherwise (5) free the originalPath member of the shadowhandle, (6) for each FSLX_PFO_ENTRY: remove the entry from the list, free the file path, dereference the File Object, close the directory handle, and free the FSLX_PFO_ENTRY structure, (7) for each SH_RET_ENTRY: remove the entry from the list and free the name and structure, (8) free the search string, and (9) free the structure.

IRP_MJ_CREATE: Get the full file name and full parent directory path for the request. Determine if the File Object represents a file or a directory. If the File Object represents a directory, determine if it represents the root directory. Check to see if this is a reentrant call for which the SL_OPEN_TARGET_DIRECTORY bit in currentIrpStack→Flags should be set. If this is a reentrant create, get the shadowHandle object for this File Object, increment the reference count on the shadowHandle if there is one, and return. Determine the owner layer. If the path of the file being opened is in a redirected area, and if the file that is being created is on the delete list, create and fill in an FSLX_DELETE_ENTRY_REMOVE structure and return. The completion routine for that operation checks to see if the create was successful and, if so, removes the delete entry from the delete list. Check to see if the create is for a *.Config or a *.Manifest file. If it is, set a flag, for which at the completion of this routine if the return code is STATUS_OBJECT_PATH_NOT_FOUND the return code is changed to STATUS_OBJECT_NAME_NOT_FOUND. If the request is for a directory, do (1) if a shadowHandle already exists for the parameter referenced File Object, increment it's reference count, (2) if a shadowHandle does not exist, create one with all entries initialized to default values, and for each layer that contains a corresponding directory or delete entries that correspond to the directory, create an FSLX_PFO_ENTRY entry. Determine if the parameter referenced request should be redirected: (1) if the request is a write request and capture mode is enabled, do (a) make sure the parent directory is in the layer being captured, (b) if the parameter referenced request is to a file and if a delete entry exists for the file, create an FSLX_DELETE_ENTRY_REMOVE structure so that the delete entry can be removed if this operation is successful, (c) if the parameter referenced request is to a file and if a delete entry does not exist for the file, use the standard search order to locate and copy any existing file to the writable portion of the layer being captured, and (d) redirect the create to the writable portion of the layer being captured and return; (2) if no layers have the directory and it is an open (not a create), don't redirect and return from the function call; (3) if there is no owner layer, do: (a) if the request is a write request, don't redirect and return from the function call, (b) if the request is a read request, find a first file by iterating through each layer in the search path, and redirect to that file unless the file is on a delete list; (4) if an owner layer can be identified, and if the request is a write request: (a) make sure the directory path exists in the writable section of the owner layer, (b) if the parameter referenced request is to a file, and if a delete entry exists for the file, create an FSLX_DELETE_ENTRY_REMOVE structure so that the delete entry can be removed upon function call completion, (c) if the parameter referenced request is to a file, and if no delete entry exists for the file, use the standard search order to locate and copy any existing file to the writable portion of the layer being captured, and (d) redirect the writable portion of the layer being captured and return; and (5) if an owner layer can be identified, and if the request is a read request, find a first file by iterating through each layer in the search path, and redirect to that file unless the file is on a delete list. If the file that is being opened is on the delete list, return STATUS_OBJECT_NAME_NOT_FOUND. If the open is being performed with the FILE_DELETE_ON_CLOSE flag, and if the parameter referenced file is a file that should be protected from delete, (1) clear the FILE_DELETE_ON_CLOSE flag, and (2) create an FSLXDELETIONCANDIDATE structure, later used in the completion routine to add a delete entry for the file. Return a value that indicates success or failure.

IRP_MJ_CREATE: (completion routine) If the create operation is being canceled, free the shadowHandle if one exists, free any existing FSLXDELETIONCANDIDATE and return. If the create operation failed, free any existing shadowHandle and FSLXDELETIONCANDIDATE and return. If an FSLX_DELETE_ENTRY_REMOVE exists, use it to remove the delete entry from the delete list.

IRP_MJ_DIRECTORY_CONTROL: If the minor function code is IRP_MN_QUERY_DIRECTORY, (1) get the shadowHandle for the File Object, (2) if there is no shadowhandle, return, (3) if the root directory is being enumerated, do not return "." or ".." entries, (4) enumerate the corresponding directories in each layer and the real directory. Use SH_RET_ENTRY structures to make sure duplicate entries are not returned.

IRP_MJ_SET_INFORMATION: If the FileInformationClass is FileDispositionInformation, if the file is being deleted, and if it is a file that should be protected from deletion, create an FSLXDELETIONCANDIDATE structure to be used in the completion routine to add a delete entry for the referenced file. Otherwise, if FileInformationClass is FileRenameInformation, do the following: (1) if the requested operation is a rename operation on a protected file that should succeed, copy the source file to the writable section of the owner layer and create a delete list entry for the source file, (2) if the requested operation is a rename operation on an unprotected file, perform the rename operation and create an FSLX_RENAME_ENTRY entry for the source file.

IRP_MJ_SET_INFORMATION: (completion routine) If FileInformationClass is FileRenameInformation, and if there is an FSLX_RENAME_ENTRY, use the contained information to create a delete entry for the source file of the rename operation. If FileInformationClass is FileDispositionInformation, do: (1) if the operation was successful and the file was deleted, get the FSLXDELETIONCANDIDATE structure, and if the deleted file was not in the writable section of the owner layer, cancel the deletion, (2) if the operation was successful and the delete operation was canceled, remove any existing FSLXDELETIONCANDIDATE, or (3) if the operation was unsuccessful, and if a deletion was being attempted, remove any existing FSLXDELETIONCANDIDATE.

Registry Calls:

RegCloseKey: If this call is re-entrant, pass the call parameters to the OS. Since all NtClose calls come through this hook and not just RegCloseKey calls, make sure that this call is a close for a registry handle. If not, pass the call parameters to the OS. Get the shadowKey structure. If there exists a shadowKey, (1) free the shadowKey and all FSLXREGOPENKEY structures by closing the handle to the key and freeing the structure, and (2) if the main key handle has not been closed, close it. If there is no shadowKey, close the handle. Remove any PFSLXOPENREGHANDLE.

RegCreateKey: If this call is re-entrant, pass the call parameters to the OS. If requesting in a redirected part of the registry, pass the call parameters to the OS. Get the PID of the caller. If there is a delete entry corresponding to the requested create operation, (1) create a new key in the writable section of the owner layer, (2) if unable to create the key, return an error, (3) change the disposition to REG_CREATED_NEW_KEY, (4) create a new shadowKey structure for the created key, (5) determine the owner layer for the key, (6) if there is an owner layer (a) allocate a new FSLXSHADOWKEY structure and initialize with default values and (b) create an FSLXREGOPENKEY entries for applicable layers, (7) if the key does not exist in the base registry, but does in one or more layers, create a user mode handle to be returned to the calling application, and (8) remove the delete entry. Otherwise if there is no delete entry corresponding to the requested create operation, continue. Create a shadowKey structure. Determine the owner layer for the key. If there is an owner layer (1) allocate a new FSLXSHADOWKEY structure and initialize with default values, and (2) create FSLXREGOPENKEY entries for applicable layers. If the key does not exist in the base registry but it does in one or more layers, create a user mode handle to be returned to the calling application. If the key can be opened (not created), set the disposition to REG_OPENED_EXISTING_KEY, create a new PFSLXOPENREGHANDLE and return. If creation of a key in the writable section of an owner layer is successful, do: (1) set the disposition to REG_CREATED_NEW_KEY, (2) create a PFSLXOPENREGHANDLE, and (3) return. If the error code from the creation attempt was STATUS_OBJECT_PATH_NOT_FOUND, return STATUS_OBJECT_PATH_NOT_FOUND. If a key was not created in the writable section of an owner layer, attempt to create the key in the base registry, create a PFSLXOPENREGHANDLE, and return.

RegDeleteKey: If this call is re-entrant, pass the call parameters to the OS. Otherwise, if there is an owner layer, do: (1) if the key has child keys, return STATUS_ACCESS_DENIED, or (2) if the key has no child keys, create a delete entry for the key. If there is no owner layer, do: (1) if there is a shadowKey, delete the key from the base registry and add delete entries to all layers, or (2) if there is no shadowKey, delete the key from the base registry.

RegDeleteValueKey: If this call is re-entrant, pass the call parameters to the OS. Otherwise, if there is an owner layer, create a delete entry for the value. If there is no owner layer, delete the value from the real registry and create delete entries for all applicable layers.

RegEnumerateKey: If this call is re-entrant, pass the call parameters to the OS. Otherwise, if there is a shadowKey, (1) enumerate through the read registry and applicable layers, (2) store state information in the shadowKey. Do not return duplicate entries. If there is no shadowKey, pass the call parameters to the OS.

RegEnumerateValueKey: If this call is re-entrant, pass the call parameters to the OS. Otherwise, if there is a shadowKey, (1) enumerate through the read registry and applicable layers, (2) store state information in the shadowKey. Do not return duplicate entries. If there is no shadowKey, pass the call parameters to the OS.

RegFlushKey: If this call is re-entrant, pass the call parameters to the OS. If there is a shadowKey, flush the real registry key and all applicable layer keys. Otherwise, pass the call parameters to the OS.

RegOpenKey: If this call is re-entrant, or if the key is in the redirection area of the registry, pass the call parameters to the OS. Otherwise, get the caller's PID. If there is a delete entry for this open, return STATUS_OBJECT_NAME_NOT_FOUND. Create a shadowKey. Try to identify an owner layer. If an owner layer can be identified, (1) allocate a new FSLXSHADOWKEY structure initialized with default values, (2) create FSLXREGOPENKEY entries for applicable layers, and if a key does not exist in the base registry but it does in one or more layers, create a user mode handle to be returned to the calling application. If the open operation was successful, create a PFSLXOPENREGHANDLE.

RegQueryKey: If this call is re-entrant, pass the call parameters to the OS. If there is no shadowKey and the request is of class "KeyNameInformation", get the key name and if it is the name of a redirect key, change it to the base name. If there is a shadowKey and there is a delete entry found for this key, return STATUS_OBJECT_NAME_NOT_FOUND. If there is a shadowKey and there is not a delete entry for this key, query the real registry key and all applicable layer keys. Depending on the class of query, combine the results and return them to the user.

RegQueryValueKey: If this call is re-entrant, or if there is no shadowKey, pass the call parameters to the OS. If there is a delete entry for this value, return STATUS_OBJECT_NAME_NOT_FOUND. Otherwise, if there is a shadow key, use the standard search order to find the value to return.

RegSetValueKey: If this call is re-entrant, or if there is no owner layer, pass the call parameters to the OS. Otherwise, set the value in the writable portion of the owner layer. If the setting operation was successful, remove any delete entry for the value and return.

In the example systems the FSLLIB32.DLL runtime library provides an API that may be used by other applications to manage the layered system and communicate with the FSLX driver, and further provides system management function implementations. That library includes functions to load and unload the FSLX driver, identify version information for itself and FSLX driver; begin and end Capture mode; begin and end Delete Capture mode; import and export layers; create, delete, rename and merge layers; activate and deactivate layers; get layer information; enumerate layers; enumerate the files of a layer; enumerate the registry entries of a layer; manipulate the registry entries of a layer; enable and disable layers; set and unset an "active on start" layer property, create and delete layer groups; enumerate layer groups; add and remove layers from layer groups; verify system integrity; enumerate layer variables; create and delete layer variables; and delete the writable portion of a layer and create a new, empty writable portion. A discussion of the individual exported functions follows with greater specificity, using C language prototypes:

| Function | Description |
| --- | --- |
| FSLActivate( PTCHAR fslName) | Validates the fslName against defined layers. If corresponding layer or group is defined, get information. If fslName corresponds to a group, recursively call FSLActivate for each layer in the group. Communicates with FSLX driver via an IOCTL to active the layer. Notifies the Windows Explorer that classes may have changed. For each virtual directory contained in the newly activated layer, notify the Windows Explorer that the directory contents have changed. Applications in the layer that are specified to be run on system startup (in win.ini, registry, startup folder, etc.) are started. Return a value indicating success or failure. |
| FSLAddLayerToGroup( PTCHAR fslName, PTCHAR groupName) | Verifies that both the specified layer and group are defined. Creates a subkey under the group key with the name of the layer, adding the layer to the group. Return a value indicating success or failure. |
| FSLAddVariable( PTCHAR fslName, PTCHAR varName, PTCHAR varValue) | Verifies the specified layer is defined. Open the variables key for the specified layer. Set a registry value using the provided varName and varValue. Return a value indicating success or failure. |
| FSLCreate( PTCHAR fslName, BOOL createPeer) | Verifies the specified layer is not defined. Create a layer definition with default values. Create the layer redirection area in the file system(s). If createPeer is true, recursively call FSLCreate for the peer with createPeer set to FALSE, and set the peer entries in the layers to point to each other. Return a value indicating success or failure. |
| FSLCreateGroup( PTCHAR groupName) | Validates groupName. If the group already exists, return an error. Create a new group named groupName under the group key HKEY_LOCAL_MACHINE\SYSTEM\FSLogic\groups) Return a value indicating success or failure. |
| FSLDeactivate( PTCHAR fslName, BOOL force, PDWORD pPid) | Validate fslName, and get information about the corresponding layer or group. If fslName corresponds to a group, recursively call FSLDeactivate for each layer of the group. If fslName corresponds to a layer, communicate with the FSLX driver through an IOCTL to deactivate the layer. If the FSLX driver returns an error that there is a PID running from this layer and force is true, kill the PID corresponding to pPid. Return a value indicating success or failure. |
| FSLDelete( PTCHAR fslName, BOOL deletePeer, BOOL force, PDWORD pPid) | Validates fslName. If the corresponding layer does not exist, or if the corresponding layer has not been deactivated, return an error. If deletePeer is TRUE, recursively call FSLDelete with the name of the peer layer, with deletePeer set to FALSE. Mark the layer as deleted. Remove the fslrdr registry branch for the corresponding layer. Remove the layer from any group entries. Return a value indicating success or failure. |
| FSLDeleteGroup( PTCHAR groupName) | Validates groupName. Deletes the group key and any subkeys or values. Return a value indicating success or failure. |
| FSLDeletePeer( PTCHAR fslName, BOOL force, PDWORD pPid) | Validates fslName. Finds the peer for fslName. Calls FSLDelete using the found peer name. Return a value indicating success or failure. |
| FSLDeleteVariable( PTCHAR fslName, PTCHAR varName) | Validates fslName. Delete any variable/value pair from the layer's variables key. Return a value indicating success or failure. |
| FSLEnable( PTCHAR fslName, BOOL bEnable) | Validate fslName, and get information about the corresponding layer or group. If fslName corresponds to a group, recursively call FSLEnable using the same bEnable for each layer of the group. If fslName corresponds to a layer, set the enabled value of the corresponding layer based on bEnable. Return a value indicating success or failure. |
| FSLEndCapture( PTCHAR fslName) | Validate fslName. Communicates with FSLX driver through an IOCTL call to cause the driver to exit capture mode. Notifies Windows Explorer that classes may have changed. For each directory contained in the newly activated layer, Windows Explorer is notified that the directory contents have changed. Return a value indicating success or failure. |
| FSLExport( PTCHAR fslName, PTCHAR archivePath, BOOL replaceIfExists, PTCHAR errorStr, void (__stdcall | Validate fslName, and get information about the corresponding layer or group. If bInitialCall is TRUE, perform a number of initialization steps including (1) validating the archivePath, (2) testing for the existence of an archive file in the archivePath directory, (3) if the replaceIfExists flag is FALSE, returning an error if an archive file already exists in the archivePath directory, |

-continued

| Function | Description |
|---|---|
| *RTInfoFunc)(PFSL__IMP__EXP pImpexp), BOOL bInitialCall) | (4) if the replaceIfExists flag is TRUE, deleting an archive file located in the archivePath directory, (5) if fslName corresponds to a layer having a peer layer, recursively calling FSLExport once for both the corresponding layer and the peer layer with bInitialCall set to FALSE, followed by closing the archive file. Otherwise, if fslName corresponds to a layer group, perform a number of steps including (1) for each layer of the group, recursively calling FSLExport for each layer and any existing peer layer to each layer with bInitialCall set to FALSE, (2) storing the group name in the archive, (3) placing a version number in the archive, and (4) closing the archive file. If bInitialCall is FALSE and fslName corresponds to a layer, perform the steps of (1) creating a new archive file if it has not yet been created, (2) opening the archive file, (3) exporting the fslrdr portion of the registry of the layer to a new file, (4) exporting the layer definition in the system registry to a new file, (5) creating a file designating the name of the layer, (6) adding all of the created files in the previous three steps plus the files in the redirection area of the file systems of the layer to the archive, (7) placing a version number in the archive, (8) closing the archive file, and (9) removing the exported registry files and layer name designation file. Return a value indicating success or failure. |
| FSLFindClose( HANDLE hFindFile) | Call FindClose (of the WIN32 API) using hFindFile. Return a value indicating success or failure. |
| FSLFindCloseGroup( PFSL__FIND *groupFind) | Close the registry key in groupFind. Return a value indicating success or failure. |
| FSLFindCloseLayer( PFSL__FIND *fslFind) | Close the registry key in fslFind. Return a value indicating success or failure. |
| FSLFindCloseLayerInGroup( PFSL__FIND *fslFind) | Close the registry key in fslFind. Return a value indicating success or failure. |
| FSLFindCloseVariable( PFSL__FIND *find) | Close the registry key in find. Return a value indicating success or failure. |
| FSLFindFirstFile( LPCTSTR fslName, LPCTSTR lpFileName, LPWIN32__FIND__DATA lpFindFileData) | Validate fslName. Generate a search string including the redirection area of the layer and lpFileName. Call FindFirstFile (WIN32 API) on the redirect search string. Return a value indicating success or failure. |
| FSLFindFirstGroup( PFSL__FIND *groupFind, PTCHAR groupName) | Open the parent key in the registry where all group names are stored (HKEY__LOCAL__MACHINE\SYSTEM\FSLogic\groups). Set the index in groupFind to 0. Find the first group name. Return a value indicating success or failure. |
| FSLFindFirstLayer( PFSL__FIND *fslFind, PTCHAR fslName, BOOL includePeers) | Open HKEY__LOCAL__MACHINE\SYSTEM\FSLogic\fsl. Store the handle to the key in the fslFind structure. Set the index in the fslFind structure to 0. Set includePeers in the fslFind structure to the value of includePeers. Get the first layer name from the registry (layer names are subkeys of HKEY__LOCAL__MACHINE\SYSTEM\FSLogic\FSL). If a layer is marked for deletion, go to the next layer. Skip peer layers if includePeers is FALSE. Return a value indicating success or failure. |
| FSLFindFirstLayerInGroup( PFSL__FIND *fslFind, PTCHAR groupName, PTCHAR fslName) | Open the group registry key under HKEY__LOCAL__MACHINE\SYSTEM\FSLogic\groups. Set the index in fslFind to 0. Get the first layer name from the registry. Return a value indicating success or failure. |
| FSLFindFirstVariable( PFSL__FIND *find, PTCHAR varName) | Open the variables registry key under the layer definition key. Set the index in find to 0. Find the first value (is this a var name or var value?). Return a value indicating success or failure. |
| FSLFindNextFile( HANDLE hFindFile, LPWIN32__FIND__DATA lpFindFileData) | Call FindNextFile (WIN32 API). Return a value indicating success or failure. |
| FSLFindNextGroup( PFSL__FIND *groupFind, PTCHAR groupName) | Increment the index in groupFind. Read the next group name from the registry. Return a value indicating success or failure. |
| FSLFindNextLayer( PFSL__FIND *fslFind, PTCHAR fslName) | Increment the index in the fslFind structure. Read the next layer name from the registry. Skip layers marked for deletion. If the includePeers field in fslFind is FALSE, skip peer layers. Return a value indicating success or failure. |
| FSLFindNextLayerInGroup( PFSL__FIND *fslFind, PTCHAR fslName) | Increment the index in fslFind. Read the next layer name from the group key. Return a value indicating success or failure. |
| FSLFindNextVariable( PFSL__FIND *find, PTCHAR varName) | Increment the index in find. Find the next value (is this a var name or var value?). Return a value indicating success or failure. |

-continued

| Function | Description |
|---|---|
| FSLGetDriverVersion(<br>    PDWORD pdMajVersion,<br>    PDWORD<br>pdMinVersionstruct) | Communicates to the FSL Driver via an IOCTL call to determine the FSL driver's major and minor version numbers. Sets pdMajVersion and pdMinVersion to the major and minor version numbers of the FSL driver. Return a value indicating success or failure. |
| FSLGetInfo(<br>    PTCHAR fslName,<br>    PFSL_INFO *pInfo) | Validate the fslName. Set structure pointed to by pInfo to zero. Copy the layer name into the structure. If fslName corresponds to a group, (1) set bIsGroup in pInfo to TRUE, and (2) look at all the layers in the group and set enabled, active, and activeOnStart flags of the pInfo structure appropriately. Read the active, enabled, activeOnStart, majorVersion, minorVersion, type, and peerName values from the registry and set the corresponding flags of the pInfo structure. Return a value indicating success or failure. |
| FSLGetVersion(<br>    PDWORD pdMajVersion,<br>    PDWORD<br>pdMinVersionstruct) | Sets pdMajVersion and pdMinVersion to the major and minor version numbers of the FSLX driver. Return a value indicating success or failure. |
| FSLGetVariable(<br>    PTCHAR fslName,<br>    PTCHAR varName,<br>    PTCHAR varValue) | Read the value named by varName from the specified layer's variables key into varValue. Return a value indicating success or failure. |
| FSLImport(<br>    PTCHAR archivePath,<br>    BOOL replaceIfExists,<br>    PTCHAR errorStr,<br>    void (___stdcall<br>*RTInfoFunc)(PFSL_IMP_EXP pImpexp)) | Verify the archivepath (the archivepath being the full pathname to the file). Open the archive file. Check the version numbers against what is supported by the FSLX driver (i.e. driver version number > archive version number), returning an error if unsupported. Extract the files that contain the layer and group names. Create each group. For each layer to be imported, perform the following: (1) if a layer of the same name already exists and if replaceIfExists is FALSE return an error, otherwise delete the existing layer, (2) extract all pertinent information for the layer from the archive, (3) delete the file that indicates the layer name, (4) import the registry fslrdr branch for the layer, (5) import the layer definition, (5) mark the layer as enabled, and (6) delete the layer registry information files. Close the archive. Return a value indicating success or failure. |
| FSLInitSystem(void) | Verify the FSL system: (1) make sure HKEY_LOCAL_MACHINE\SYSTEM\FSLogic\FSL exists, (2) make sure major and minor version registry value are created, (3) make sure default file system redirection path and registry redirection path registry values are set, (4) make sure HKEY_LOCAL_MACHINE\SYSTEM\fslrdr exists, and (5) make sure C:\fslrdr exists. Read default file system redirection path. Read default registry redirection path. Return a value indicating success or failure. |
| FSLIsGroup(PTCHAR name) | Validate the name. Determine if name is a valid group by attempting to open the group key under HKEY_LOCAL_MACHINE\SYSTEM\FSLogic\groups. Return a value indicating success or failure. |
| FSLLoadDriver(void) | Verify the FSL system: (1) make sure HKEY_LOCAL_MACHINE\SYSTEM\FSLogic\FSL exists, (2) make sure major and minor version registry value are created, (3) make sure default file system redirection path and registry redirection path registry values are set, (4) make sure HKEY_LOCAL_MACHINE\SYSTEM\fslrdr exists, and (5) make sure C:\fslrdr exists. Loads the driver if it is not loaded. Notifies Windows Explorer via SHChangeNotify that the C:\fslrdr directory has changed. Return a value indicating success or failure. |
| FSLRegCloseKey(HKEY hKey) | Close the registry key. Return a value indicating success or failure. |
| FSLRegCopyKey(<br>    HKEY srcKey,<br>    PTCHAR srcKeyName,<br>    HKEY destParentKey,<br>    BOOL overwrite,<br>    BOOL removeAfterCopy) | Create a new key name under the destination parent key. If the key already existed under the destination parent and overwrite is FALSE, and if copying the values and subkeys from the source would overwrite any values or subkeys in the destination return FALSE. Otherwise, copy the subkeys and values to the destination. If removeAfterCopy is TRUE, delete the registry source key with all of its subkeys and values. Return a value indicating success or failure. |
| FSLRegCopyValue(<br>    HKEY srcKey,<br>    LPCTSTR lpValueName,<br>    HKEY destKey,<br>    BOOL overwrite,<br>    BOOL removeAfterCopy) | If the value already exists under destKey and overwrite is false, return an error. Read the source value and write that value to the destination. If removeAfterCopy is TRUE, remove the source value (what about the source key?) Return a value indicating success or failure. |

-continued

| Function | Description |
| --- | --- |
| FSLRegCreateKeyEx(<br>  HKEY hKey,<br>  LPCTSTR lpSubKey,<br>  DWORD Reserved,<br>  LPTSTR lpClass,<br>  DWORD dwOptions,<br>  REGSAM samDesired,<br>  LPSECURITY_ATTRIBUTES lpSecurity Attributes,<br>  PHKEY phkResult,<br>  LPDWORD lpdwDisposition) | Create a registry path to the layer's redirection area using the layer's redirect path, its name, ans lpSubKey. Create the key in the redirection area. Return a value indicating success or failure. |
| FSLRegDeleteKey(<br>  HKEY hKey,<br>  LPCTSTR lpSubKey) | Remove the key and all subkeys and values. Return a value indicating success or failure. |
| FSLRegDeleteValue(<br>  HKEY hKey,<br>  LPCTSTR lpValueName) | Delete the specified value. Return a value indicating success or failure. |
| FSLRegEnumKeyEx(<br>  HKEY hKey,<br>  DWORD dwIndex,<br>  LPTSTR lpName,<br>  LPDWORD lpcbName,<br>  LPDWORD lpReserved,<br>  LPTSTR lpClass,<br>  LPDWORD lpcbClass,<br>  PFILETIME lpftLastWriteTime) | Enumerate the specified key. Return a value indicating success or failure. |
| FSLRegEnumValue(<br>  HKEY hKey,<br>  DWORD dwIndex,<br>  LPTSTR lpValueName,<br>  LPDWORD lpcbValueName,<br>  LPDWORD lpReserved,<br>  LPDWORD lpType,<br>  LPBYTE lpData,<br>  LPDWORD lpcbData) | Enumerate the specified value. Return a value indicating success or failure. |
| FSLRegOpenKeyEx(<br>  PTCHAR fslName,<br>  HKEY hKey,<br>  LPCTSTR lpSubKey,<br>  DWORD ulOptions,<br>  REGSAM samDesired,<br>  PHKEY phkResult) | Create a registry path to the layer's redirect area using the layer's redirect path, its name, and lpSubKey. Open the key in the redirection area. Return a value indicating success or failure. |
| FSLRegQueryValueEx(<br>  HKEY hKey,<br>  LPTSTR lpValueName,<br>  LPDWORD lpReserved,<br>  LPDWORD lpType,<br>  LPBYTE lpData,<br>  LPDWORD lpcbData) | Query the value specified. Return a value indicating success or failure. |
| FSLRegSetValueEx(<br>  HKEY hKey,<br>  LPCTSTR lpValueName,<br>  DWORD Reserved,<br>  DWORD dwType,<br>  CONST BYTE *lpData,<br>  DWORD cbData) | Set the specified value. Return a value indicating success or failure. |
| FSLRemoveLayerFromGroup(<br>  PTCHAR fslName,<br>  PTCHAR group) | Verify that the group exists, and that the layer is a member of the group. Remove the layer from the group by deleting the key with the layer's name from the group key. Return a value indicating success or failure. |
| FSLResetPeer(<br>  PTCHAR fslName,<br>  BOOL force,<br>  PDWORD pPid) | Get the peer name for this layer (writable section of the layer). Get information about the peer. make sure the peer is deactivated. Delete the peer. Create the peer. Point the layer and the new peer layer at each other by setting their peer values in the registry. If the named layer is active, activate the new peer layer. Return a value indicating success or failure. |
| FSLSetActiveOnStart(<br>  PTCHAR name,<br>  BOOL bActiveOnStart) | Verify the name corresponds to an existing layer or group. Get information about the named layer or group. If the name corresponds to a group, recursively call FSLSetActiveOnStart for each layer in the group. Otherwise, set the activeOnStart value for the layer to bActiveOnStart. Return a value indicating success or failure. |

-continued

| Function | Description |
|---|---|
| FSLSetLayerInfo(<br>  PTCHAR name,<br>  PTCHAR fileRedirect,<br>  PTCHAR regRedirect,<br>  DWORD *pType,<br>  DWORD *pReadOnly,<br>  PTCHAR peerName) | Verify that the name corresponds to a layer. Open the registry key that contains the layer definition. If fileRedirect is specified, set the value of the proper registry value. If regRedirect is specified do: (1) set the value of the proper registry value, (2) create the specified redirect path, (3) create the redirect root keys (HLM, HCU, HU, HCC, and HCR). If type is specified, set the value of the proper registry value. If readOnly is specified, set the value of the proper registry value. If peerName is specified, set the value of the proper registry value. Return a value indicating success or failure. |
| FSLStartCapture(<br>  PTCHAR fslName,<br>  BOOL bTrack,<br>  DWORD dPid) | Validates fslName to make sure it is a valid layer name (legal characters, etc.) Communicates to the FSL Driver via an IOCTL to put it into Capture mode. Notifies Windows Explorer that classes may have changed. For each directory contained in the newly activated layer, Windows Explorer is notified that the directory contents have changes. Applications in the layer that are specified to be run on system startup are started (there are several places where these can be specified: win.ini, registry, startup folder, etc.) Return a value indicating success or failure. |
| FSLUnloadDriver(BOOL force) | All active layers are deactivated. Unloads the FSLX driver. Notifies Windows Explorer via SHChangeNotify that the C:\fslrdr directory has changed. Return a value indicating success or failure. |
| FSLVerifyBaseSystem(void) | Make sure HKEY_LOCAL_MACHINE\SYSTEM\FSLogic exists. Put the current major and minor version into majorVersion and minorVersion values. Put the default File System rediredction path in a DefaultFileRedirect value. Put the default Registry redirection path in a DefaultRegistryRedirect value. Make sure HKEY_LOCAL_MACHINE\SYSTEM\fslrdr exists. Make sure fslrdr exists at the root of all file systems that will be redirected. Return a value indicating success or failure. |

Each of the above functions returns a value of the type "FSLLIB32_API DWORD_stdcall" indicating success or failure. In the above functions, the TCHAR variable type changes depending on the compilation options. If compiled for Unicode, a TCHAR is a 16 bit entity, otherwise it is an 8 byte char. A BOOL may be represented by a single bit, but is often defined to be a word so as to permit efficient word alignment according to the processor architecture. A DWORD is normally a 32-bit integer. And an LPCTSTR is a long pointer to a constant array of TCHARs.

In the example systems, on each file system volume (C:, D:, etc.) included in the system there is an fslrdr directory at the root of the volume. This directory contains file system information for each of the defined layers. Under the fslrdr directory directories that correspond to each layer are maintained. Under each of those layer directories is a directory that represents the drive letter. Under each of those letter directories the contained directories and file structures mimic the regular structure of the containing drive. When a layer is active all of the directories and files defined for the layer are overlaid on the normal file system. For example, the directory "C:\fslrdr\TEST\c\XYZCorp" is defined under a "TEST" layer. When the "TEST" layer is active, the directory "c:\XYZCorp" appears on the C: drive to all applications running under that layer, and optionally under other layers depending on the implementation details.

Intrusion Protected Layered Systems.

A system supporting layers may include extended functionality to mitigate the effect of viruses, worms, user intrusions, and other attempts to modify a protected computer system in undesirable ways. Such a system, for the purposes of this writing, will be referred to as an intrusion protected layered system (IPLS), a brief discussion of which proceeds below. A discussion of typical intrusions is helpful to understand the operation and advantages of such a system, which discussion appears above in the background section.

Speaking in general terms, a layering system may be extended to avoid intrusions by capturing the effects of those intrusions into an isolated layer. Intrusions may be detected using any number of methods and triggers, several examples of which will be described below. A layering system may permit some file accesses, including writes, to pass through to underlying file systems, or to other layers reserved for purposes other than capturing intrusions or other activities of suspicion.

Figure 12:
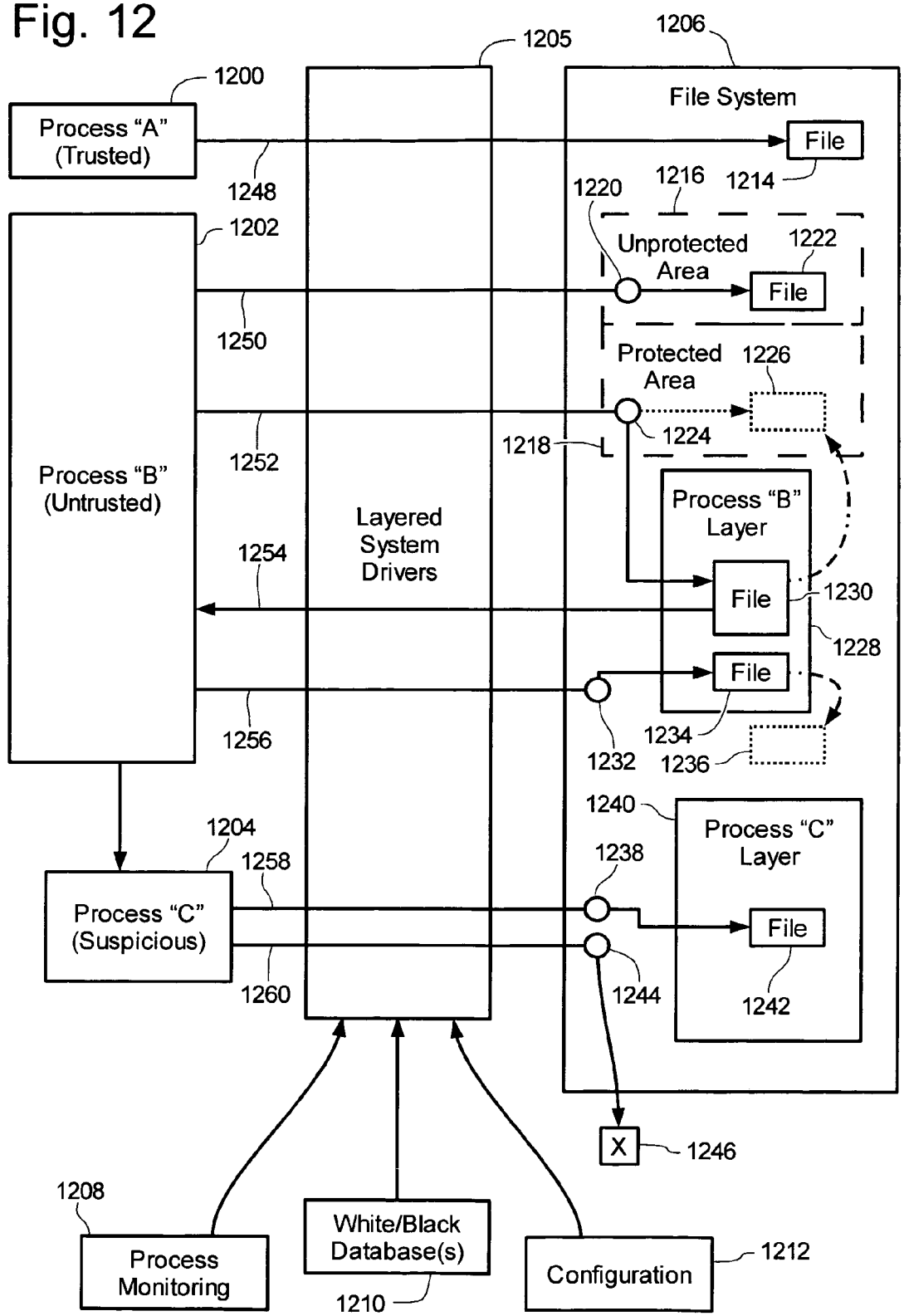
FIG. 12 depicts an exemplary Intrusion Protective Layered System and the operation thereof.

As an introduction to to concepts presented below, the conceptual operation of an exemplary IPLS is illustrated in FIG. 12. That system includes an operating system on which is installed layered system drivers 1205, as spoken of above. A file system 1206, which might reside on a local hard drive, network drive, removable drive, or any other storage device is provided, accessible to drivers 1205. A first process 1200, labeled "A", produces a file access directed to file system 1206, which file accesses are managed by drivers 1205. Process "A" might, for example, be running on the same computing device and/or operating system as drivers 1205, under which file system 1206 is also managed. Although the same computing system might be shared in this way, there is no reason why processes, layered system drivers and file systems might be located on different computing systems, for example by using network facilities and drivers.

In the example of FIG. 12 the layered system drivers 1205 include process characterization, meaning that processes are assigned trustworthiness to write to file system 1206. A process monitoring component 1208 monitors the creation and ending of processes, and might maintain a table of running processes and process characterizations. Component 1208 might be implemented as a part of an operating system kernel, or as an add-on thereof. Component 1208 may maintain a "scoreboard" of processes, referenced by process ID, containing the trust value of each process. As processes are requested to be created or ended, the kernel may be made to adjust a scoreboard, or other structure, making initial process characterizations on process creation. Likewise, component 1208 might be run as a separate process monitoring the process list periodically, adjusting the characterizations and process listings as needed. Alternatively, component 1208 might characterize a process only at times when file write accesses are requested therefrom. Many other implementations of process monitoring 1208 are possible, and no particular implementation is considered required.

In the example of FIG. 12 processes may be characterized one of three ways. Processes which are considered unlikely to be exploited for intrusions are characterized as "trusted." Trusted processes might be processes which have no interaction with users, a network, or other means of intrusion. Processes that have been tested and/or verified to be reasonably exploit-free might also be considered trusted, if desired. Other processes which are known to have exploits that an intrusive attack may utilize, or even processes that are known to have been infected are considered "suspicious". Other processes are considered "untrusted", meaning that a lack of information exists to categorize those processes as trusted or suspicious.

Now that trinary trust system is merely one of many possible trust schemes that might be implemented. For example, an additional trust level "highly suspect" might be applied to processes that almost certainly have been exploited for intrusion. A binary system might indicate merely a trusted or suspicous status. Fuzzy logic might also be applied, producing a numeric value of trust on a scale ranging from complete trustworthiness to highly suspicous, utilizing thresholds to discriminate proper behaviors of an IPLS system.

In the example, process "A" 1200 is considered trusted by the layered system drivers 1205. A request to write a file 1248 from process "A" is also considered to be trusted, and the write operation is permitted to become an actual write to file 1214 in file system 1206. Process "B" 1202, on the other hand, is not considered trusted nor suspicious, but rather is considered untrusted pending detected suspicious behavior. Process "B" might be, for example, an email client, a web browser or other application that provides access to potentially intrusive sources of information. For untrusted processes, an unprotected area 1216 and a protected area 1218 are defined in configuration 1212 for interaction with untrusted processes. Process "B" initially opens 1250 to write a file at a location 1220 in unprotected area 1216. Drivers 1205 compare location 1220 against the bounds of unprotected area 1216 and/or protected area 1218. Drivers 1205 determine that location 1220 resides in unprotected area 1216, and permit the write 1250 to become resident in file 1222 on file system 1206.

A second write 1252 from untrusted process "B" is directed to a location 1224 in protected area 1218. Drivers 1205 detect this attempt to write protected area 1218, which is by definition an intrusion. Drivers 1205 then starts a new layer 1228 specifically for process "B", which layer becomes an isolation layer, and then marks process "B" to be suspicious. Driver then directs write 1252 into the new layer 1228 to file object 1230. A read 1254 from process "B" to the file reference 1224 yields delivery of file object 1230 as is that object resided on file system 1206. Were write request 1252 a request to delete a file, file object 1230 would reflect the absence of the file, and drivers 1205 would present the absence of the file to process "B".

In the example of FIG. 12, the only processes having access to objects within isolation layers are the processes which wrote those file objects, and perhaps processes spawned therefrom. By doing so, the isolated file objects are prevented contact from other applications and processes that might access or execute those objects, potentially causing further intrusion or damage. In that regard drivers 1205 form a private layered system for isolation layers. Other IPLS systems might be fashioned providing public access to file objects within isolation layers, i.e. to processes and applications generally. In those systems it may be desirable to take further measures to mitigate the potential cascade of damage, for example by marking processes suspicious that attempt to access file objects in isolation layers.

After being marked suspicious, subsequent writes from process "B", for example 1256, are directed into the isolation layer 1228, regardless of where the file locations 1232 are in relation to the file system 1206 organization. This may be done on the assumption that once a process has behaved suspiciously, it may be infected. Subsequent writes may be attempts by the intruder to cause further damage to the file system. Directing these writes into the isolation layer is not necessarily destructive, if means are provided to move file objects from the isolation layer to the file system 1206.

The write attempt 1252 to protected area 1218 may not have actually been caused by an intrusive attack. For example, a user may have mistakenly attempted to save a file into the protected area. It may therefore be desirable to include a facility that moves isolated file objects, such as 1230 and 1234, into an unlayered file system, or a non-isolation layer. In the example of FIG. 12, that operation is called a merge operation, merging, for example, isolation layer 1228 back into file system 1206. In that merge operation, file objects 1230 and 1234 are copied to true files 1226 and 1236, respectively, after which isolation layer 1228 may be deleted. The merge operation may be conducted by way of user interaction, by which a user may indicate the acceptance of the merge operation.

Further in FIG. 12, running process "C" 1204 was characterized by drivers 1205 "suspicious" when started. In this example, process "C" was spawned from process "B", which might have occurred if a user either actively or inadvertently caused an email attachment to be executed, in one example. This IPLS is configurable to deal with suspicious processes in two ways. First, if it is considered that writes from suspicious process "C" are never to be kept those changes may be discarded. For example, write request 1260 attempts to write to file system 1206 at location 1244. Driver 1205, upon direction from configuration 1212, operates as if write data from process "C" were being written (maintaining buffers, file pointers, and other structures) but does not write that data to any storage other than transient storage (i.e. only to RAM). Alternately, configuration 1212 might specify that writes from suspicious process "C" be stored to an isolation layer. In that case, write 1258 specifies a write to location 1238 in file system 1206, but is actually stored to file object 1242 in isolation layer 1240. A system may use both these and other methods of isolating writes from suspicious processes, particularly if applicable configuration specifies behaviors in more than one circumstance. For example, a system may be configured to discard writes by suspicious processes to system directories or particularly susceptible files, and capture writes to other locations.

Suspicious processes, such as process "C", may be identified by drivers 1205 as will be described shortly. Suspicious processes might include any number of processes known to have intrusive effects. Those might include, for example, executable files circulating on the Internet, virus infected files, processes opening unusual network ports, root kits, processes which write large amounts of data, processes which produce large amounts of network traffic, spyware, and applications having well-known or frequently used exploits. Again, writes from suspicous applications may be discarded to protect the underlying file systems.

In the past the study of viruses and worms "in the wild" has been difficult, as those programs may make changes that are difficult to find on a computer by a typical user. To discover new viruses and/or worms, a test machine (or "honeypot") is placed on the Internet by a counter-intrusion specialist organization, which may be monitored for changes against a "virgin" installation. As there are many more user computers on the Internet than honeypots, the deliterious effects of an intrusive program occur many times before the counter-intrusion specialists can detect and counteract the intrusive program.

Furthermore, if a network user's computer becomes infected, the entire hard drive image must typically be examined in detail for traces of the virus or worm. This involves a laborious process of comparing known files (executables, libraries and other program binaries) against the files on the infected hard drive, looking for an as-yet unidentified fingerprint. Because of this, examination of a user's hard drive is rarely undertaken. An IPLS can provide protection against viruses and other intrusive programs, even if no information is available about potential viruses, by detecting suspicious behavior.

If writes from suspicious processes are captured to isolation layers, those layers may be used to study or identify the effects of those processes. For example, if an IPLS detects and isolates suspicious writes to an isolation layer, that layer may be exported and delivered to an administrator for analysis. If a local administrator is unable to identify the isolated changes as legitimate, the layer may be sent to a counter-intrusion specialist for examination. Viruses and worms rarely write more than a few files on a computer, because they are usually not intended to disable the computer but rather control it in a limited way. An isolation layer is therefore likely to contain only a few file objects, which simplifies the examination of the intrusive program's effects. If IPLSs are incorporated to a significant number of computers on the Internet, intrusions are likely to be detected earlier, perhaps hours or even minutes after release. An isolation layer may be sent quickly to a counter-intrusion specialist, whose study may yield fingerprint data that can be used in anti-virus software. Likewise, executable binaries isolated to the layer may be examined or run in controlled conditions to detect the operation of other intrusive programs, for example worms or spyware, and counter-programs or notices developed and released. Thus an isolation layer facilitates the creation of anti-intrusion applications and measures.

Using an IPLS as described above provides a new way of protecting computing systems while permitting operation thereof even though intrusions are suspected to have occurred. It may be the case that a computing system is susceptible to intrusive attack, however that system is required to be in use regularly and may not be taken down for any significant time for restorative or disinfectant activities. With more frequent use of the Internet in recent years, many business computing systems are regularly exposed to intrusive attacks, those systems also used regularly for important purposes. Home users are also exposed to attack, which users may not have the skill to restore their computer systems after an attack. In the past, some intrusive attacks, for example many virus attacks, have been restorable using anti-virus software while a computer is in use. Other intrusive attacks, for example attacks that overwrite system files, have required a system to be reinstalled fresh, which requires discontined use of that system.

Because an IPLS utilizes isolation layers as described above, suspicious written files, although isolated in layers, remain available to system applications. Thus the IPLS may operate transparently to the user; he may not even be aware of the IPLS operation until and unless the IPLS presents him with notifications of suspicious processes, options to merge files or other information related to IPLS operation.

Even if an IPLS isolates a harmless write, a computing system may remain in normal operation without any significant disruption of that resource. When convenient, isolated layers may be committed by a merge operation, if found to be innocuous, or may be discarded (in whole or in part) if found to be likely to contain intrusions. A system might employ automatic methods of determining which files are innocuous, for example by comparing the difference in overwritten files for changes too small to be useful as an intrusion. A tool might also be provided which permits a user or administrator to view the changes captured in an isolation layer, which may serve as information to whether or not that isolation layer should be merged. If an isolation layer is dependent on other isolation layers (i.e. it arose from a process spawned from another process under suspicion), both layers may be required to be approved before performing the mergence. Furthermore, some captured changes may require a system reboot, for example changes to a system directory. An IPLS may provide for mergences to occur on system startup or shutdown as needed.

Characterization of Writes and Processes

The operation of the exemplary IPLS described above relies on the characterization of processes as trusted, untrusted or suspicious. The characterization of process may be accomplished by a number of methods.

In a first method, a database is referenced when processes are started, for example 1210 in FIG. 12. The database may contain references to executable binaries or processes that are trusted (a "white" list) and/or processes that are automatically marked suspicious (a "black" list.) A white list might contain the identities of system processes, and applications known to be (relatively) exploit-free. A black list might contain the identities of suspicious programs, for example worms, spyware or remote-access utilities. The creation of a black list is probably best left to counter-intrusion specialists, who would have the best knowledge of the many and diverse intrusive attacks. New black lists or addendums to existing black lists might be periodically provided to keep those black databases up to date. Black list entries might also be added by local administrators for intrusions noticed or for programs the administrator wishes to isolate.

White lists may be more conveniently fashioned, as the contents of a base installation of an operating system or an application are identifiable at the time of installation. For example, a system administrator may set up a computer with a base operating system and a set of applications to a computer. Before attaching that computer to a network, he may run a white list creation utility that inventories the newly installed files, creating a white list or database containing entries for all of the fresh and known-good installed files. Entries may then be removed from the white list for applications vulnerable to intrusive attacks, such as email clients, web browsers and network services. An operating system vendor might provide a white list for a particular version of an operating system as a convenience, avoiding the inventorying step to the user/administrator. Likewise, an application vendor might provide a white list for that application, which may be merged or appended to an existing white database. Because, for some platform types, the number of intrusive programs likely far outnumbers the number of "white" applications on a computing system, it may be expected that an effective black database may be much larger than a white database for that system.

If white or black databases are referenced by an IPLS, it may be expected that some processes may be started that do not have entries to characterize those processes. A default characterization may be applied, pending further information by which a process may be more accurately characterized. In the example of FIG. 12, an unlisted process is first characterized as "untrusted." If suspicous activity is detected, that process is then recharacterized as "suspicious", and may be further recharacterized back to "untrusted" or even "trusted" by a user or administrator indication. In an alternate method, no databases are consulted but rather all new processes are categorized as untrusted or trusted. In the alternate method, changes made by individual new processes are captured to independent layers facilitating removal and management thereof.

The identification of processes may be accomplished in a number of ways. A first method is simply to review the execution string of a process, which will point back to the executable file which the process originates. Although a simple method of identification, this method may be susceptible to spoofing attacks, particularly where executable binaries are stored to writable file systems. To spoof the IPLS into believing the process to be trusted, an exploitive attack borrows the name of a trusted executable, perhaps listed in a white list or database. If this method of identification is used, a white list entry may include not only the name of the executable file, but also the expected location of the file in the file system. Thus a process executing from a different location would not be mis-identified. An intruder might exploit the system, however, by replacing the trusted executable with one containing a back door or other exploit.

A second, better identification method utilizes a fingerprint of the file originating a process. A fingerprint, for this purpose, is any unique (or relatively unique) identifier whereby a process or the executable binary originating the process may be recognized between different instances of execution. Any CRC algorithm or cryptographic hash, for example the MD5SUM hash, is suitable for producing a fingerprint, if used to produce the fingerprint from either the whole or a significantly unique portion of the binary executable data of a process. This method may be utilized with minimal impact on system resources, as the fingerprint algorithm could be performed on the executable binary program data as it is loaded into RAM. If that is done, no additional reads from storage are required, and the only penalty is to the processing requirements of the fingerprint algorithm. Even so, if an executable's file data is not in cache, the algorithm might be run while waiting for data to arrive from storage, in which case there might be no noticable delay. If that method is used, a white or a black list entry may contain the fingerprint data, which might again be an MD5SUM hash value. This method is considered highly secure, as crafting an exploitive program that can produce the same hash value as another program is nearly impossible, if the hashed values include a sufficient number of bits.

Rarely, executables of the same application might differ between instances, for example if the executable binary file is modified by an installation program to include a license key or other copy-protective information. If that is the case, the fingerprints for processes running from those different binaries will also differ. This problem may be overcome by specifying parts of the binary to apply the fingerprint algorithm, or parts to exclude (the parts which change). If desired, a script or other application might be provided in connection with such an application useful to verify an executable and thereby provide identification.

Other methods might utilize a process hook to perform a verification step. In that step, the process may be queried to identify itself with a passphrase, or might be requested to produce a checksum of its program data, perhaps combined with an encryption or decryption step with the IPLS to avoid spoofing attacks. That query might be best performed at the time of process initialization. Yet other methods not described herein may be used without departing from the inventive concepts.

Figure 11A:
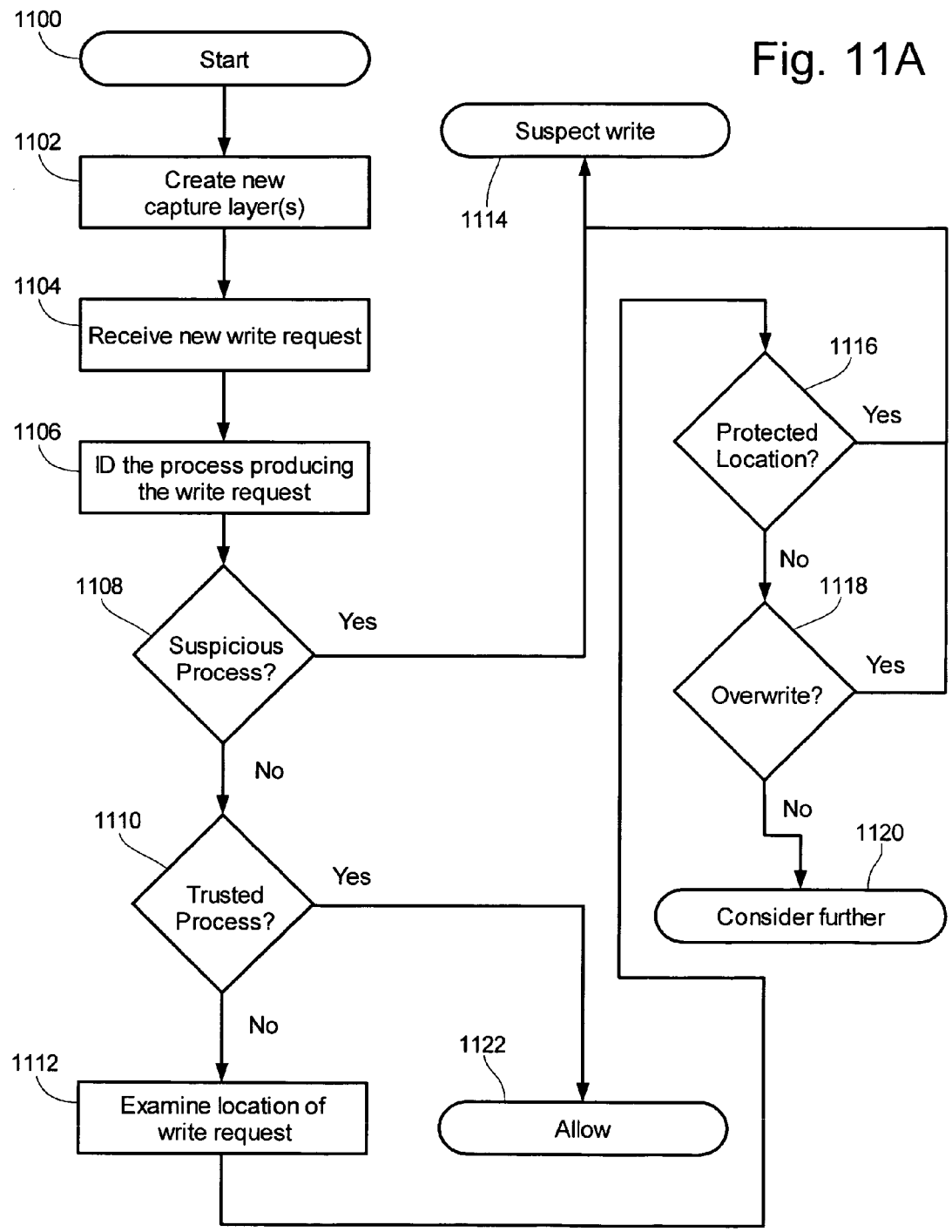
FIGS. 11A and 11B depict an exemplary method of isolating potentially intrusive attacks into layers.
Figure 11B:
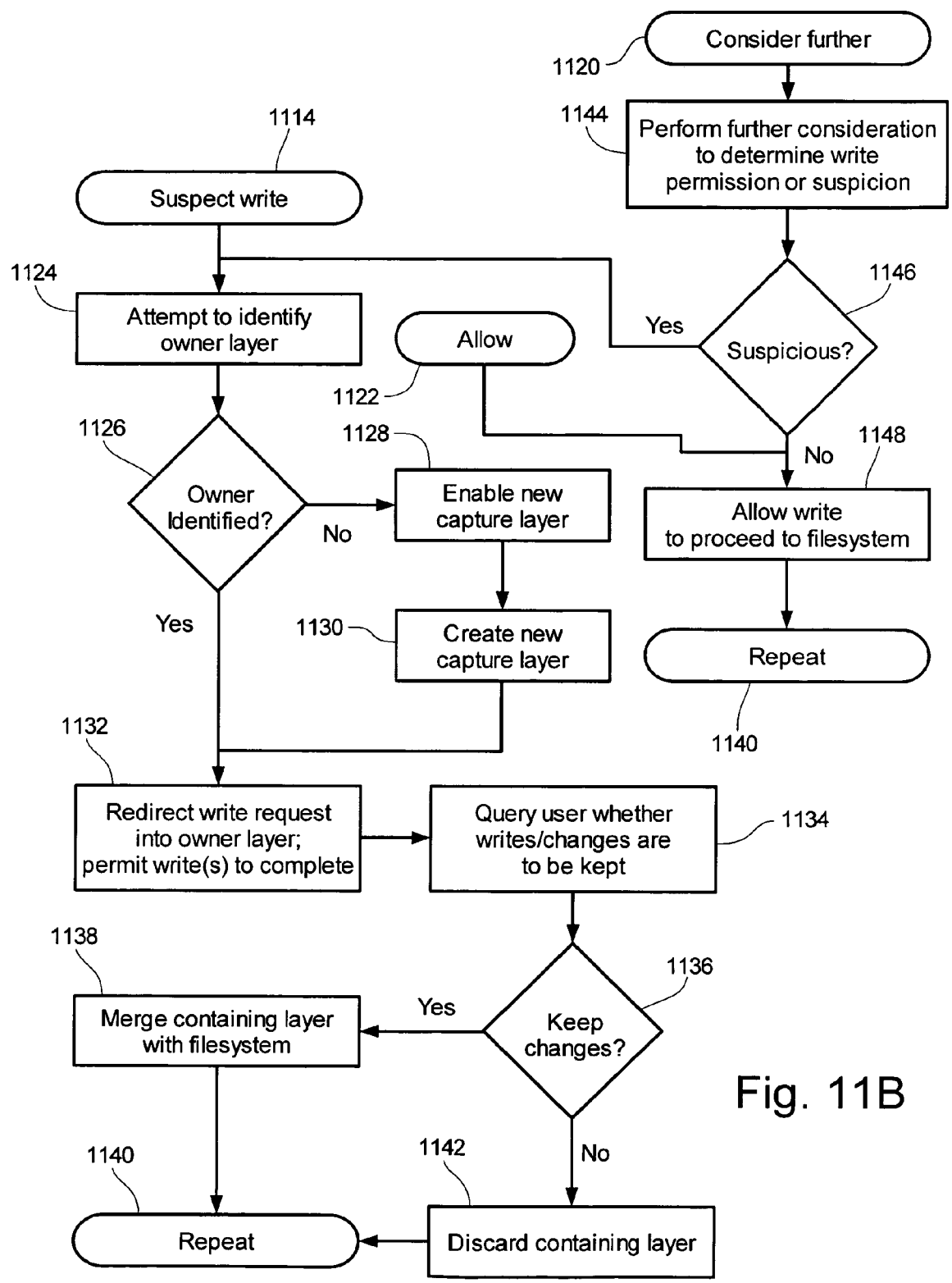

A method of operating an exemplary IPLS is further illustrated in FIGS. 11A and 11B. That method begins with steps 1100 and 1102, resulting in the creation of a new capture layer, which for the purposes of the method is an isolation layer. In this method, a new and ready capture layer is created first to reduce any delay between the detection of a suspicious write and the acual write to the isolation layer itself. Nevertheless, if the overhead of new layer creation is small, or if delays are acceptable, new layers may be created at the time they are needed. The method proceeds to wait, in step 1104, for a new write request, which may be a request directed to a filesystem or an existing layer. Opon receipt of a write request, in step 1106 the method attempts to identify the process producing the write request, that identity including a level of trustworthiness as described herein. In 1108 the method branches to process a suspect write operation 1114, if the trustworthiness of the identified process is at a suspicious level. Otherwise, the method branches 1110 to allow 1122 the write request if the process has a trusted status. If neither branch is taken, the process producing the write has neither suspicion nor trustworthiness, and further processing is needed to process the write request. In that case, in step 1116 the location of the write request is compared with locations configured to be protected. If the request is to an unprotected location, the method then considers 1118 whether an important file (such as a system file) is attempting to be overwritten. If neither is the case, the method continues for further consideration 1120. Otherwise, the write is suspect, and the method proceeds to process the write request as a suspect write 1114.

Now referring to FIG. 11B, if further consideration was needed by reaching step 1120, step 1144 proceeds to evaluate the write request against other criteria not enumerated here. If further consideration does not yield suspicion 1146, the write request is permitted to proceed to the filesystem or other non-isolated layer. Should suspicion be determined in steps 1108, 1116, 1118 or 1146, the method first attempts to identify 1124 an owner layer to isolate the write request. An isolation layer may already be in existence for the originating process, in which case the determination of an owner layer 1126 falls through to step 1132. If no isolation owner layer is identified, the layer created eariler is enabled 1128 for the process, and a new capture layer 1130 is readied for the next suspicious process. In either case, in step 1132 the write request is redirected into the owner layer.

Processing may continue for any period of time. At some point, however, a suspicious process will terminate, and all write operations will be permitted to come to completion within the corresponding isolation layer. When that happens, the user may be queried 1134 as to whether or not to keep the writes of that particular process. If the user indicates in the affirmative, in step 1136, the processes isolation layer is merged 1138 with the filesystem or non-isolation layer. Otherwise, the isolation layer may be discarded 1142, which also discards any isolated written files from the suspect process. Following either an isolated write to a layer or a non-isolated write, the process is repeated 1140 for successive write requests. Now although the method is shown as a serial method for simplicity of explanation, it will be understood that the method would actually be more usefully performed in parallel, permitting several write operations, isolation layers and processes to operate simultaneously.

Figure 13:
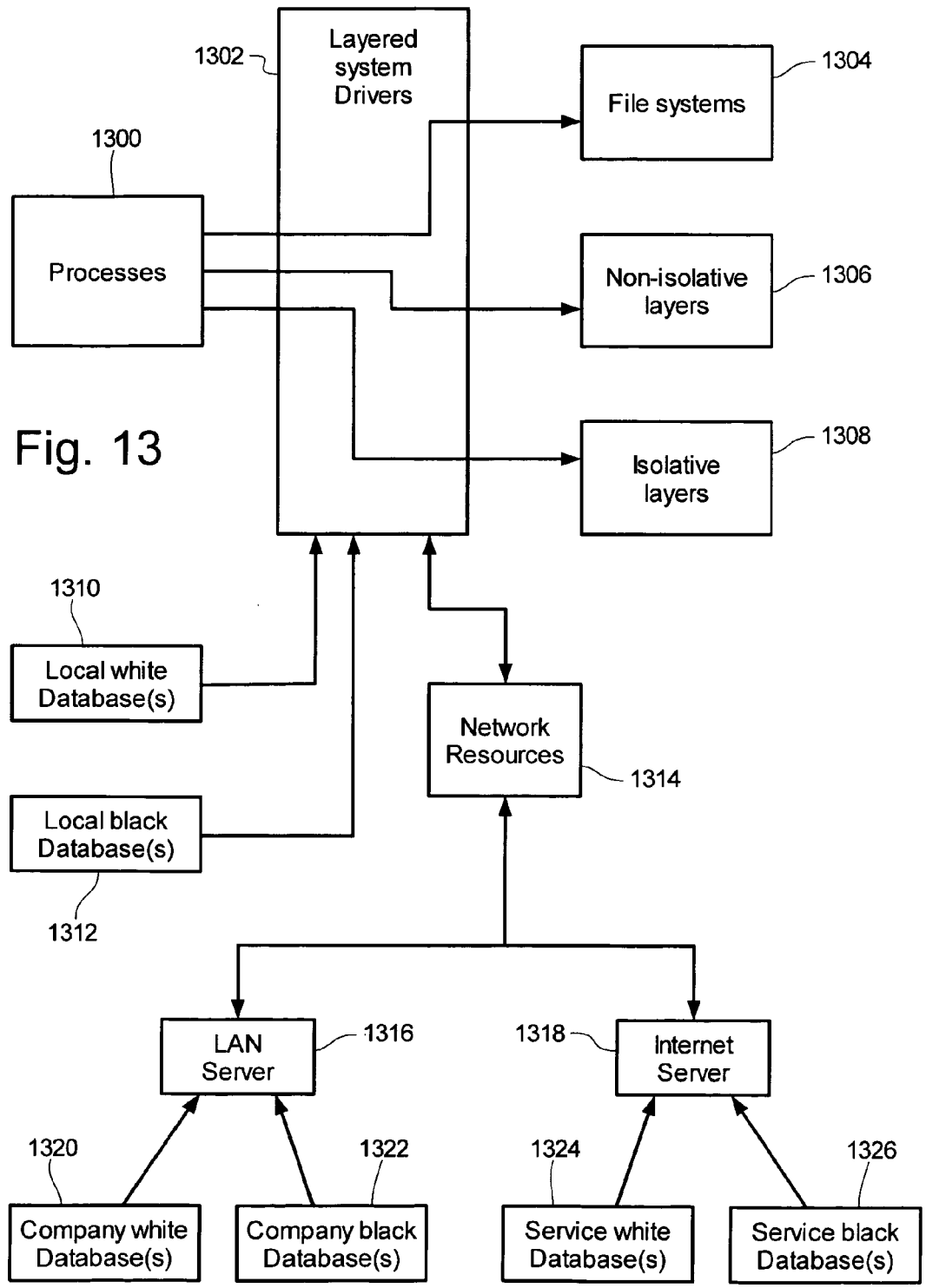
FIG. 13 depicts another exemplary Intrusion Protective Layered System that utilizes external identification databases.

External white and/or black lists or databases might be employed in an IPLS system. Referring now to FIG. 13, an exemplary IPLS is shown having running processes 1300, layered system drivers 1302, and file systems 1304 as in the example of FIG. 12. Non-isolative layers 1306, which are layers existing for purposes other than isolating suspect writes, may also be used as desired. Isolative layers 1308 may be created as processes attempt suspect writes to file system 1304 or to non-isolative layers 1306. In the course of identifying processes 1300, a local white database 1310 and/or a local black database 1312 may be referenced. The use of local databases 1310 and 1312 provide fast identification of processes, for example processes that are frequently used.

The IPLS of FIG. 13 further includes network access to network resources 1314, which might be network hardware and drivers. Drivers 1302 may be configured to access external black or white databases, if referencing local databases does not resolve an identity to a process. In this example, a company LAN server 1316 is provided to maintain a company-wide white database 1320 and/or a black database 1322, which might contain fingerprints as described above. Databases 1320 and 1322 may be consulted as needed, if identification of processes fails using the local databases. Entries might be added to a company database by an administrator for the application sets installed to the computers of the company.

External databases might be provided by an outside business entity, for example as a subscription service over the Internet. Utilizing such a service might provide economy in administration of a number of IPLSs, particularly if a number of companies are served. Internet server 1318 providing white database 1324 and black database 1326 provides that function in the example of FIG. 13. Configuration may be provided to the IPLS specifying the order in which databases should be consulted, which might prefer looking in local databases first. If external databases are consulted, local databases may be updated with process identification permitting fast lookup without network consultation in future lookups. The local databases might thereby become in essence caches of the external databases. In an alternate configuration, a peer network might be used between several companies or entities by which white or black databases are accessed and/or updated.

If, after consulting the available databases, an IPLS is unable to identify a process, the system may consider the new process as suspect. An unidentifiable process might be a new intrusive process, and the IPLS may assign suspect categorization in self-protection. This would be reasonable for a user computer, where applications remain stable, but not for a developer's computer. Other categorizations may be assigned, for example "untrusted", as desired on process non-identification.

If an IPLS is unable to identify a particular process, the user or an administrator may be consulted whether to allow the process to run unisolated. For example, the user may have executed a newly installed application for which a fingerprint has not yet been recorded. An administrator may choose to allow the application to run as "trusted" or "untrusted", also creating a new fingerprint entry in the appropriate white database. On the other hand, if an administrator cannot find a legitimate reason why a particular process would be running, he may elect to provide the fingerprint of the suspicious process to counter-intrusion specialists as a possibly intrusive program. The administrator may also provide a copy of the executable originating the process and any isolative layer produced from the process. By doing so new viruses, worms or other intrusive programs may be detected early and countermeasures developed rapidly.

For accessing external databases over a network, blocking issues should be considered. Before a process is permitted to run or execute a write operation, and external database may need to be consulted. If a network resource is busy or down, the external database lookup may fail in the short term. In a simple method, the IPLS may simply block the execution of the process until a repeated lookup attempt succeeds. That method may have undesirable consequences in the form of frozen applications, noticable delays, and inability to control or close applications on a computer. For example, an email includes an executable attachment, which a user selects to run. The email system executes a system call to start the attachment process as a child process, which causes the system to fingerprint the attached executable, which fails due to inaccessibility of the external database. The email process may be frozen in the system call, and may not respond to other interaction attempts (such as to bring to the foreground, update, or close).

To avoid these undesirable effects of blocking, an IPLS may be configured to take a default action after some period of time, for example one second. That default action might be to immediately characterize the blocked process as suspicious and thereby isolate all writes produced therefrom. Optionally, repeated lookups from an external database may be continued even after permitting execution of the previously blocked process. If a repeated lookup indicates a non-suspicious process, the isolation layer started may be automatically merged back to the system, resulting in a state as if the first lookup had been successful. Alternatively, the default action might be to characterize the process as untrusted, on the assumption that intrusions are unlikely while a network is inaccessible. That default action might be preferable in circumstances where it is deemed more desirable to keep a system running at the expense of possible intrustions.

Alternatively, if an external database lookup is unavailable, a user or administrator may be queries as to what should be done. This alternative may resolve a large number of problems, particularly because the actions of a user are likely the cause of the lookup. For example, a user might have downloaded an application from the Internet, and installed it to his computer. Later, the user executes the application for the first time while the local network is down or unconnected. It is proper for the IPLS to query the user in that case, because the user can decide whether to trust the application's behavior. In alternate modes, the IPLS may make such a user query before or at the time of process identification, providing a user more direct and immediate control. For example, if an administrator is installing a software package to an IPLS protected system, it may be helpful to provide the administrator a way of inidicating the installation process, which may not yet have fingerprint in a white database, to be trustworthy, preventing the IPLS from isolating the installation in a layer.

If desired, local write and/or black databases may be periodically updated or synchronized from a central authority. The local databases may be modified to include new fingerprint entries, or may be overwritten entirely. This updating may occur automatically through software, or may be manually initiated. By keeping updated local databases, occurrances of unidentifiable processes may be reduced to the point that interaction with external databases is unnecessary. Should a process be executed that cannot be identified from local databases, that process may be marked as suspicious and a report submitted to the central authority. The central authority may engage to identify the process and may create a new fingerprint entry in a future distributed white or black list, as appropriate.

Now it will not always be desirable to trust a user with a decision of process characterization. The are unsophisticated users that might be exposed to intrusive software, for example in emails or downloadable from websites. Some users might be lured into running programs by false advertisements, lack of care, or merely to see what a program will do. An administrator, therefore, might be better suited to make a decision concerning process characterization, and an impediment may be used to prevent the user from mischaracterizing a process. Appropriate impediments include passwords, or other authorization tokens or methods. A user might optionally be given authority to execute an unregistered process as "suspected", which would ensure that changes made could be backed out. Passwords might also be applied to merge queries, whereby a merge is not permitted without proper authorization.

Blocking unregistered processes may yield undesirable results, including windows that don't update or close, or applications that stop a shutdown process because they won't terminate. As mitigation, the layered system drivers may detect a system shutdown (by many possible different methods) and cause all pending external database lookups and/or write operations to fail, which may cause frozen processes to either terminate or receive pending signals to terminate, permitting the shutdown operation to complete.

Other methods may be used to characterize processes, alone or in conjunction with the methods described above. In one method already described in connection with FIG. 12, portions of the file system may be designated to be protected or unprotected, which may trigger changes in process characterization. A portion of a file system may be defined by a list of directories, files, or both. An untrusted process that attempts to write to a protected directory logically becomes suspicious. Protected areas might include, for example, operating system directories. Certain files and areas, for example core system files, should never be written to; an attempt to write those files may lead to more extreme measures such as higher suspicion characterization, the discarding of further writes, or process termination. In a related method, protected or unprotected areas may be defined for individual applications or groups of applications. Those application-defined areas may be customized for an application, permitting an application to write to files and locations appropriate to the application. For example, a web server should be permitted to write log files into its configured log directory. Likewise, a backup program should be permitted to write a tape drive or other storage device. User applications, for example word processing programs, should be permitted to write to user directories such as under "/home" or "My Documents." Files to be written to shared locations, such as network drives, might require a higher degree of trustworthiness to avoid spreading an intrusive change across a network.

In a related method, a driver may also consider the file type being written. For example, files with a ".txt" extension or with execution permissions off might be considered innocuous. In that event, writing innocuous files to even protected directories might not necessarily trigger the suspicion of the IPLS. On the other hand, attempts to write existing executable programs, except by installation tools and the like, are more likely to be intrusive attacks that in IPLS may consider suspicious. Processes that attempt to bypass the standard I/O channels (by writing vectors or BIOS calls) may be considered highly suspicious.

In another method of characterization, the trust characterization of a process may be extended to spawned processes. For example, an untrusted browser spawns another browser process in a new window. The new process might logically take on the parent's untrusted characterization. System applications may sometimes spawn multiple processes, for example print queue managers for several processes. If network printing is disabled for a computer, the master print process might be characterized as "trusted", as there is little risk of exploitation. Likewise, processes spawned from suspicious processes may also be marked suspicious. Spawned print queue managers for individual processes might also be characterized as trusted, particularly in the absence of any known exploitive method. The reverse might also apply. A browser that has spawned a suspect process might itself have been exploited, and would therefore also become suspect.

In a related method, the IPLS may consider the type of application. With the present prevalence of virus propogation being by e-mail attachments, a system might wisely mark any process spawned from an attachment of an e-mail client as suspicious. Other applications might be treated similarly, for example web browsers, instant messaging programs and other types of network utilities. The application type may logically be assigned in conjunction with a process identity in a white or black database, or in another database, as desired.

In other methods of characterization, the behavior of processes may be monitored for unusual activity. For example, a process that sources a large amount of network activity may be the product of an intrusion, either by an exploit or by covert placement by a user. An IPLS may monitor network activity, as well as other factors, mark offending processes as suspicious, and allocate the process executables and write operations to a new isolation layer.

Similarly, the IPLS may consider processes that start or are active at unusual times to be suspicious. For example, an executable in a user directory should probably not be active when a user is not logged on. A backup program, however, may be configured to operate at night when no user is logged on. An IPLS might be configurable to let legitimate activities pass without suspicion.

Now although the method of FIGS. 11A and 11B is shown with relative sophistication, other simpler detection methods might be used. For example, a detection trigger might only operate for writes initiated by processes under suspicion without regard to the location of the file references in the underlying file system. Alternatively, a system might not maintain a process scoreboard, but rather only encapsulate writes made to protected areas of the file system. Other methods might permit modifications to the detection method, the encapsulation method or user interaction, which modifications may be employed without departing from the concepts and spirit of the invention.

IPLS Integrated Systems

An IPLS may be integrated with protective software, for example anti-virus software. In one particular integrated IPLS system, writes may be cached in memory prior to writing to storage. Upon closing of a file being written, that system scans the cached version for viruses and possibly other intrusive changes. If an intrusion is detected by scanning, the writing process may be characterized as suspicious (or highly suspicious), and the cached file may be directed to an isolation layer. An isolation layer containing a detected virus may be disabled from mergence as a protective measure. If a virus is not detected, the cached file may be permitted to proceed normally in a non-isolative manner. Now this integration may be considered an improvement, in that that protection is enhanced over the protections provided by a basic IPLS system as described above.

An IPLS might also be integrated with other system management tools. For example, the NS utility avaliable from Altiris of Lindon, Utah provides a platform for managing the software on a group of client computers. The IPLS functions available to administrators at a computer might also be made available to administrators remotely. For example the activities of mergence, IPLS configuration and updating of black and white databases may be remotely performed and monitored.

Now the layered systems described in connection with the methods of intrusive protection described are exemplary, and may be varied as desired while maintinaing a protective function. For example, some of the layered systems described above include redirections for registry settings apart from files. A protective system may be fashioned without special treatment for registry settings; indeed the layering of only files in isolation may provide adequate protection under many circumstances.

While the present systems and methods have been described and illustrated in conjunction with a number of specific configurations, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed is:

1. An Intrusion Protected Layered System for isolating intrusive attacks on a computing system in isolation layers, those attacks including modifications to at least files on the computing system, comprising:
   a computing system, said computing system capable of executing processes;
   at least one storage device;
   at least one file system located to said storage devices; and
   computer executable instructions stored to said storage devices, said instructions executable by said computing system to perform the functions of:
   (i) identifying running processes, said identifying optionally occurring as the processes are initiated,
   (ii) assigning processes categorizations of trust, the categorizations of trust providing at least one "suspicious" categorization for processes at a level of suspicion sufficient to isolate write requests and at least one other categorization for other processes permitted to write to a file system or other storage container,
   (iii) operating at least one isolation layer capable of containing file objects,
   (iv) assigning an isolation layer to each process categorized under a "suspicious" categorization,
   (v) for processes categorized under a "suspicious" categorization, directing write requests into the isolation layer assigned for those processes,
   (vi) for processes not categorized under a "suspicious" categorization, permitting write requests to be written to a file system or other storage container rather than an isolation layer, and
   (vii) providing access to file objects located in isolation layers, the access being provided to at least the processes assigned to each corresponding isolation layer.

2. An Intrusion Protected Layered System according to claim 1, further comprising a database containing process identity information and trust level information, and further whereby for processes identified from said database those processes are assigned trust categorizations from said database.

3. An Intrusion Protected Layered System according to claim 2, further comprising network resources, and whereby said instructions are further executable by said computing system to perform the functions of:
   (viii) accessing, by way of said network resources, an external database of process identity information.

4. An Intrusion Protected Layered System according to claim 3, whereby if the access of an external database fails, a user query is produced requesting instructions as to the assignment of a categorization of trust.

5. An Intrusion Protected Layered System according to claim 3, whereby if the access of an external database fails, a default assignment of trust categorization is made.

6. An Intrusion Protected Layered System according to claim 2, wherein said database indicates at least one process identity is to be assigned a non-suspicious category of trust.

7. An Intrusion Protected Layered System according to claim 2, wherein said database indicates at least one process identity is to be assigned a suspicious category of trust.

8. An Intrusion Protected Layered System according to claim 2, wherein said database contains process fingerprints, and whereby said system utilizes a fingerprint algorithm to identify processes.

9. An Intrusion Protected Layered System according to claim 1, wherein said system restricts access to file objects located in isolation layers to processes having an assignment to those particular layers.

10. An Intrusion Protected Layered System according to claim 1, wherein said system permits access to file objects located in isolation layers to processes generally.

11. An Intrusion Protected Layered System according to claim 1, wherein said system requires an authentication step before a non-suspicious characterization of a process.

12. An Intrusion Protected Layered System according to claim 1, wherein spawned processes are assigned a trust characterization of processes from which they were spawned.

13. An Intrusion Protected Layered System according to claim 1, wherein characterizations of trust are assigned by application type.

14. An Intrusion Protected Layered System according to claim 1, wherein said system is integrated with a system management tool.

15. An Intrusion Protected Layered System for isolating intrusive attacks on a computing system in isolation layers, those attacks including modifications to at least files on the computing system, comprising:
   a computing system, said computing system capable of executing processes;
   at least one storage device;
   a database containing process identity information and trust level information;
   at least one file system located to said storage devices; and
   computer executable instructions stored to said storage devices, said instructions executable by said computing system to perform the functions of:
   (i) identifying running processes, said identifying optionally occurring as the processes are initiated, (ii) assigning processes categorizations of trust, the assignment utilizing the trust level information contained in said database, the categorizations of trust providing at least one "suspicious" categorization for processes at a level of suspicion sufficient to isolate write requests and at least one other categorization for other processes permitted to write to a file system or other storage container, (iii) operating at least one isolation layer capable of containing file objects, (iv) assigning an isolation layer to each process categorized under a "suspicious" categorization, (v) for processes categorized under a "suspicious" categorization, directing write requests into the isolation layer assigned for those processes, (vi) for processes not categorized under a "suspicious" categorization, permitting write requests to be written to a file system or other storage container rather than an isolation layer, and (vii) providing access to file objects located in isolation layers, the access being provided to at least the processes assigned to each corresponding isolation layer.

16. An Intrusion Protected Layered System according to claim 15, further comprising network resources, and whereby said instructions are further executable by said computing system to perform the functions of:

(viii) accessing, by way of said network resources, an external database of process identity information.

17. An Intrusion Protected Layered System according to claim 15, wherein said database contains process fingerprints, and whereby said system utilizes a fingerprint algorithm to identify processes.

18. An Intrusion Protected Layered System according to claim 15, wherein spawned processes are assigned a trust characterization of processes from which they were spawned.

19. An Intrusion Protected Layered System according to claim 15, wherein characterizations of trust are assigned by application type.

20. An Intrusion Protected Layered System for isolating intrusive attacks on a computing system in isolation layers, those attacks including modifications to at least files on the computing system, comprising:

a computing system, said computing system capable of executing processes;

at least one storage device;

a database containing process identity information and trust level information, wherein the process identity information includes executable file fingerprints;

at least one file system located to said storage devices; and computer executable instructions stored to said storage devices, said instructions executable by said computing system to perform the functions of:

(i) identifying running processes, said identifying optionally occurring as the processes are initiated, (ii) assigning processes categorizations of trust, the assignment utilizing the trust level information contained in said database, the categorizations of trust providing at least one "suspicious" categorization for processes at a level of suspicion sufficient to isolate write requests and at least one other categorization for other processes permitted to write to a file system or other storage container, (iii) operating at least one isolation layer capable of containing file objects, (iv) assigning an isolation layer to each process categorized under a "suspicious" categorization, (v) for processes categorized under a "suspicious" categorization, directing write requests into the isolation layer assigned for those processes, (vi) for processes not categorized under a "suspicious" categorization, permitting write requests to be written to a file system or other storage container rather than an isolation layer, and (vii) providing access to file objects located in isolation layers, the access being provided to at least the processes assigned to each corresponding isolation layer.

* * * * *

UNITED STATES PATENT AND TRADEMARK OFFICE
CERTIFICATE OF CORRECTION

PATENT NO. : 7,512,977 B2  Page 1 of 1
APPLICATION NO. : 11/081856
DATED : March 31, 2009
INVENTOR(S) : Randall R. Cook, Dwain A. Kinghorn and Michael E. Sainsbury It is certified that error appears in the above-identified patent and that said Letters Patent is hereby corrected as shown below:

Title Page item 54, and column 1.

The Title should read:

Intrusion Protection System Utilizing Layers

Signed and Sealed this

Seventh Day of July, 2009

JOHN DOLL
*Acting Director of the United States Patent and Trademark Office*